(12) United States Patent
Fujii et al.

(10) Patent No.: US 8,732,461 B2
(45) Date of Patent: May 20, 2014

(54) CLIENT APPARATUS, SERVER APPARATUS, AND PROGRAM USING ENTITY AUTHENTICATION AND BIOMETRIC AUTHENTICATION

(75) Inventors: Yoshihiro Fujii, Fuchu (JP); Tatsuro Ikeda, Fuchu (JP); Koji Okada, Tokyo (JP); Tomoaki Morijiri, Chofu (JP); Minoru Nishizawa, Fuchu (JP); Hidehisa Takamizawa, Fuchu (JP); Asahiko Yamada, Tokorozawa (JP)

(73) Assignees: Kabushiki Kaisha Toshiba, Tokyo (JP); Toshiba Solutions Corporation, Tokyo (JP)

( * ) Notice: Subject to any disclaimer, the term of this patent is extended or adjusted under 35 U.S.C. 154(b) by 445 days.

(21) Appl. No.: 12/705,323

(22) Filed: Feb. 12, 2010

(65) Prior Publication Data

US 2010/0191967 A1    Jul. 29, 2010

Related U.S. Application Data

(63) Continuation of application No. PCT/JP2008/063911, filed on Aug. 1, 2008.

(30) Foreign Application Priority Data

Aug. 13, 2007  (JP) ................................ 2007-210904

(51) Int. Cl.
| | | |
|---|---|---|
| H04L 9/32 | (2006.01) | |
| H04L 29/06 | (2006.01) | |
| G06F 21/00 | (2013.01) | |
| G06F 7/04 | (2006.01) | |
| H04L 9/00 | (2006.01) | |
| H04L 9/08 | (2006.01) | |

(52) U.S. Cl.
USPC ........... 713/168; 713/156; 713/169; 713/186; 726/5; 726/10; 380/262; 380/282

(58) Field of Classification Search
USPC ................ 713/169, 156, 168, 186; 726/5, 10; 380/262, 282
See application file for complete search history.

(56) References Cited

U.S. PATENT DOCUMENTS

| 7,694,335 B1 * | 4/2010 | Turner et al. .................... 726/14 |
| 2003/0115154 A1 * | 6/2003 | Anderson et al. ............... 705/73 |

FOREIGN PATENT DOCUMENTS

| JP | 2000-3323 | 1/2000 |
| JP | 2003-44436 | 2/2003 |

(Continued)

OTHER PUBLICATIONS

T.Dierks, et al, "The TLS Protocol Version 1.0", Jan. 1999, Dierks & Allen, Standards Track, pp. 29-32 and 1 <URL:http://www.ietf.org/org/rfc/rfc/rfc2246.txt>.

(Continued)

*Primary Examiner* — Aravind Moorthy
(74) *Attorney, Agent, or Firm* — Oblon, Spivak, McClelland, Maier & Neustadt, L.L.P.

(57) ABSTRACT

A client apparatus receives a message including a random number from a server apparatus during the handshake of agreement process, creates a biometric negotiation message including the biometric authentication method information and sends the biometric negotiation message to the server apparatus. Then, the client apparatus executes a biometric authentication based on biometric authentication method information notified from the server apparatus and encrypts the random number based on the private key. In addition, the client apparatus generates an authenticator from a result of the biometric authentication, the biometric authentication method information, the encrypted random number, and the client certificate, and sends to the server apparatus an authentication context including these. The server apparatus verifies the authentication context and establishes a secure session in one handshake.

16 Claims, 17 Drawing Sheets

(56) References Cited

FOREIGN PATENT DOCUMENTS

| | | |
|---|---|---|
| JP | 2003-224562 | 8/2003 |
| JP | 2004-348308 | 12/2004 |
| JP | 2004-364303 | 12/2004 |
| JP | 2006-11768 | 1/2006 |
| JP | 2007-149066 A | 6/2007 |
| JP | 2008-59183 A | 3/2008 |
| JP | 2008-171027 | 7/2008 |
| WO | WO 2009/022560 A1 | 2/2009 |

OTHER PUBLICATIONS

P. Funk, et al, "TLS Inner Application Extension (TLS/IA) draft-funk-tls-inner-application-extension-03.txt", Jun. 25, 2006, TLS Working Group, pp. 1-38 http://tools.ieff.orf/html/draft-funk-tls-inner-application-extension-03.

S. Santesson, "RFC4680—TLS Handshake Message for Supplemental Data", Sep. 2006, Standards Track http://www.fags.org/rfc/rfc4680.html.

Office Action issued Jul. 3, 2012 in Japanese Patent Application No. 2007-210904 (with English-language translation).

Daigo Yoshii, et al., "A Note on Profile of Personal Authentication Process on Client in the Personal Authentication Framework Using Biometrics", Computer Security Symposium 2004, vol. I of II, Oct. 20, 2004, pp. 211-216.

Hidehisa Takamizawa, et al., "An Online System Using Biometric Authentication Context", Computer Security Symposium 2005, vol. I of II, Oct. 26, 2005, pp. 313-318.

Hidehisa Takamizawa, et al., "Biometric Authentication Context", Toshiba Review, vol. 60, No. 6, Jun. 1, 2005, pp. 28-31.

Asahiko Yamada, "Authentication Context for Biometrics (ACBio)", Toshiba Review, vol. 61, No. 9, Sep. 1, 2006, pp. 74-75.

K. Okada, et al., "Extensible Personal Authentication Framework using Biometrics and PKI", IWAP2004, Online URL: http://itslab.inf.kyusyu-u.ac.jp/iwap04/regular_okada.pdf, Oct. 4, 2004, pp. 1-27.

\* cited by examiner

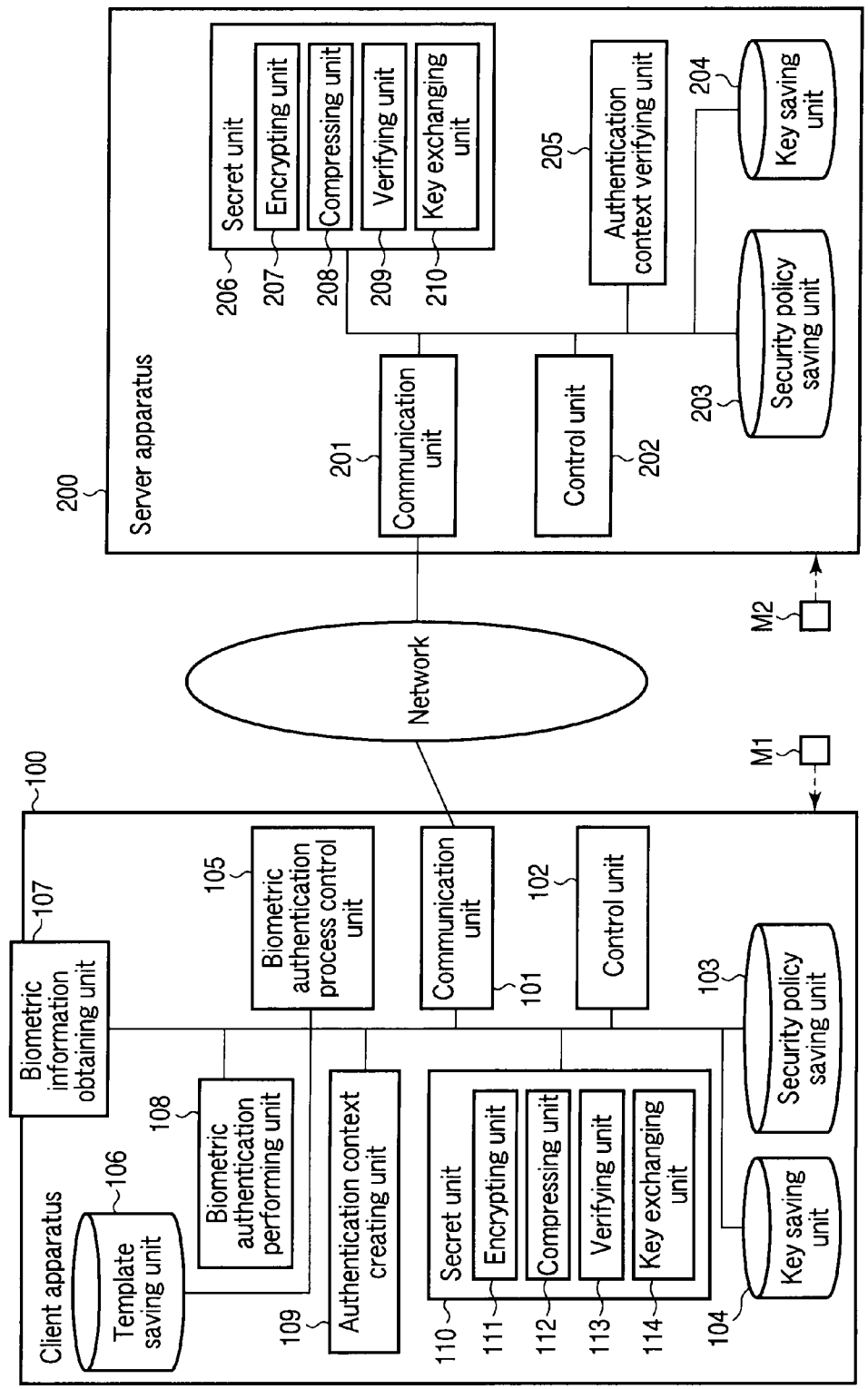
F I G. 1

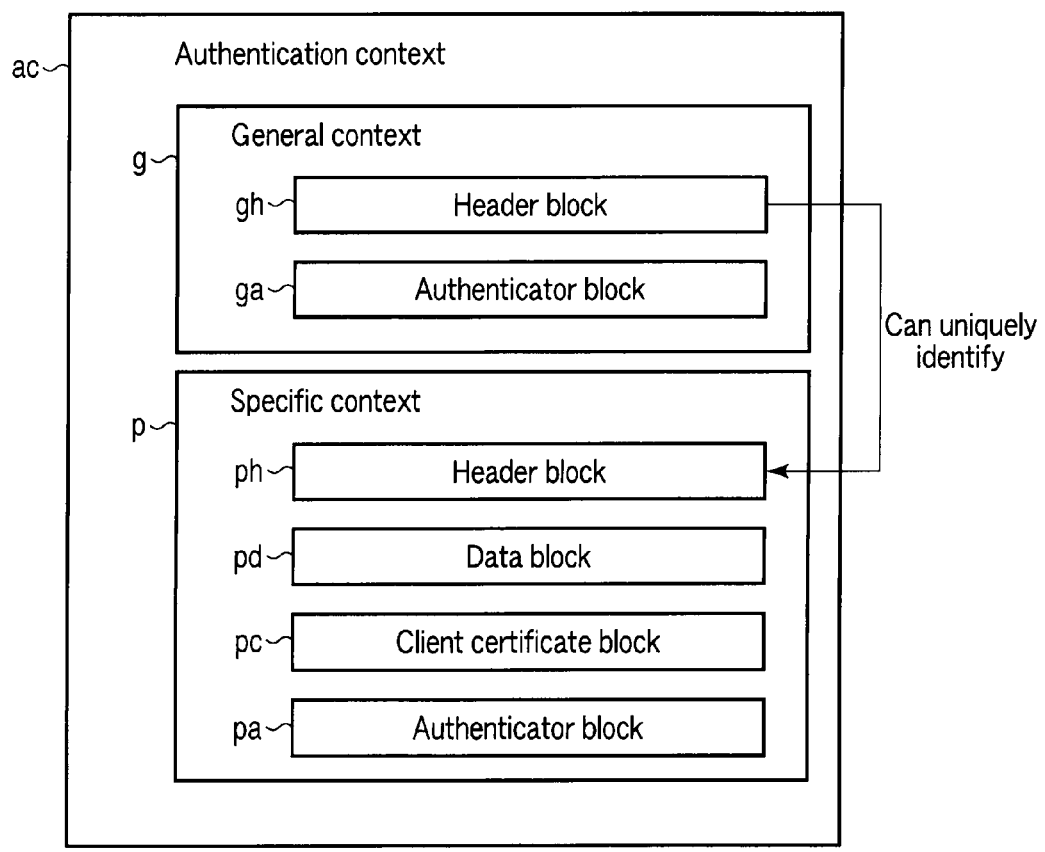
F I G. 3

```
struct{
    ProtocolVersion client_version;
    Random random;
    SessionID session_id;
    CipherSuite cipher_suites;
    CompressionMethod compression_methods;
    Extension extended_client_hello_list;
}ClientHello;
```
~MCH

```
struct{
    ExtensionType extension_type;
    ExtensionMethod extension_data;
}Extension;
```
MCH-LIST

F I G. 7

```
enum{
    client_auth;
}ExtensionType;
enum{
    unit8 AuthenticationMethod[2];
}ExtensionMethod;
```
~MCH-LIST

F I G. 8

```
struct{
    ProtocolVersion server_version;
    Random random;
    SessionID session_id;
    CipherSuite cipher_suite;
    CompressionMethod compression_method;
    Extension extended_server_hello_list;
}ServerHello;
```
~MSH

F I G. 9

```
struct{
        BiometricMethodList biometric_method_list[ ];
}ClientBiometricNegotiation;
struct{
        BiometricMethod biometric_method;
        ExtensionData extension_data;
}BiometricMethodList;
enum{
        unit8 extension_data[ ];
}ExtensionData;
```
~MCBN

FIG. 11

```
struct{
        BiometricMethodList biometric_method_list[ ];
}ServerBiometricNegotiation;

struct{
        BiometricMethod biometric_method;
        ExtensionData extension_data;
}BiometricMethodList;
```
~MSBN

FIG. 12

```
struct{
        AuthenticationResult authentication_result;
}BiometricProcess;

struct{
        AuthenticationMethod authentication_method;
        ExtensionData authentication_data;
}AuthenticationResult;
```
~MBP

FIG. 13

```
struct{
        AuthenticateResult authenticate_result;
        AuthenticateInfo authenticate_info;
        Signature signature
}BiometricVerify;
```
~MBV

F I G. 14

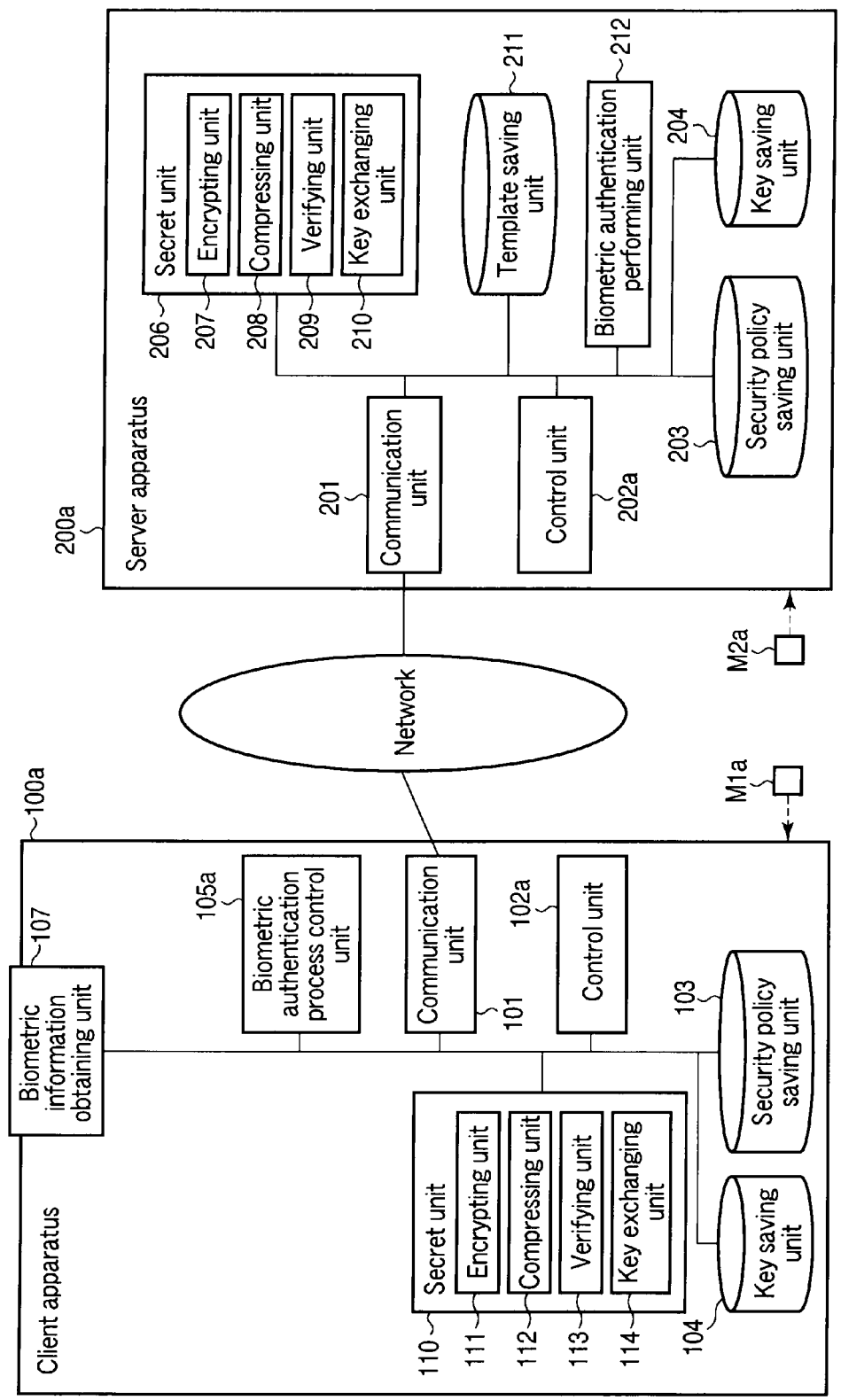
F I G. 15

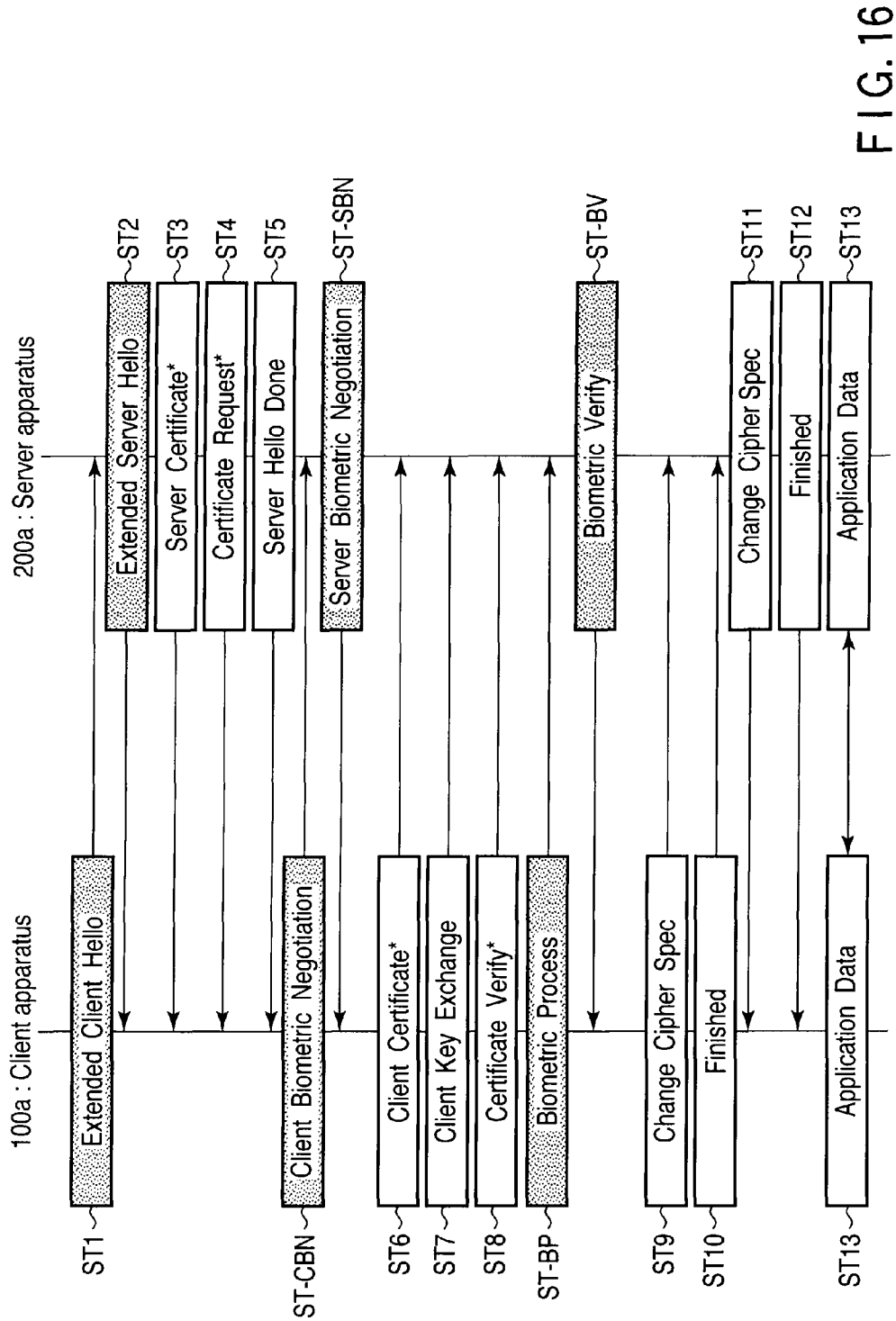
F I G. 16

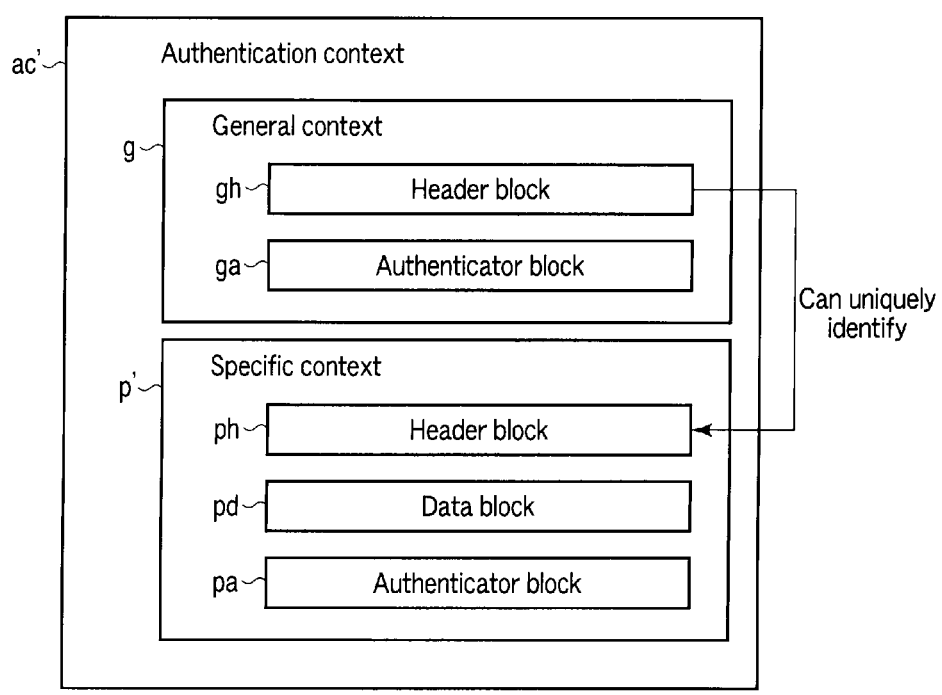
F I G. 18

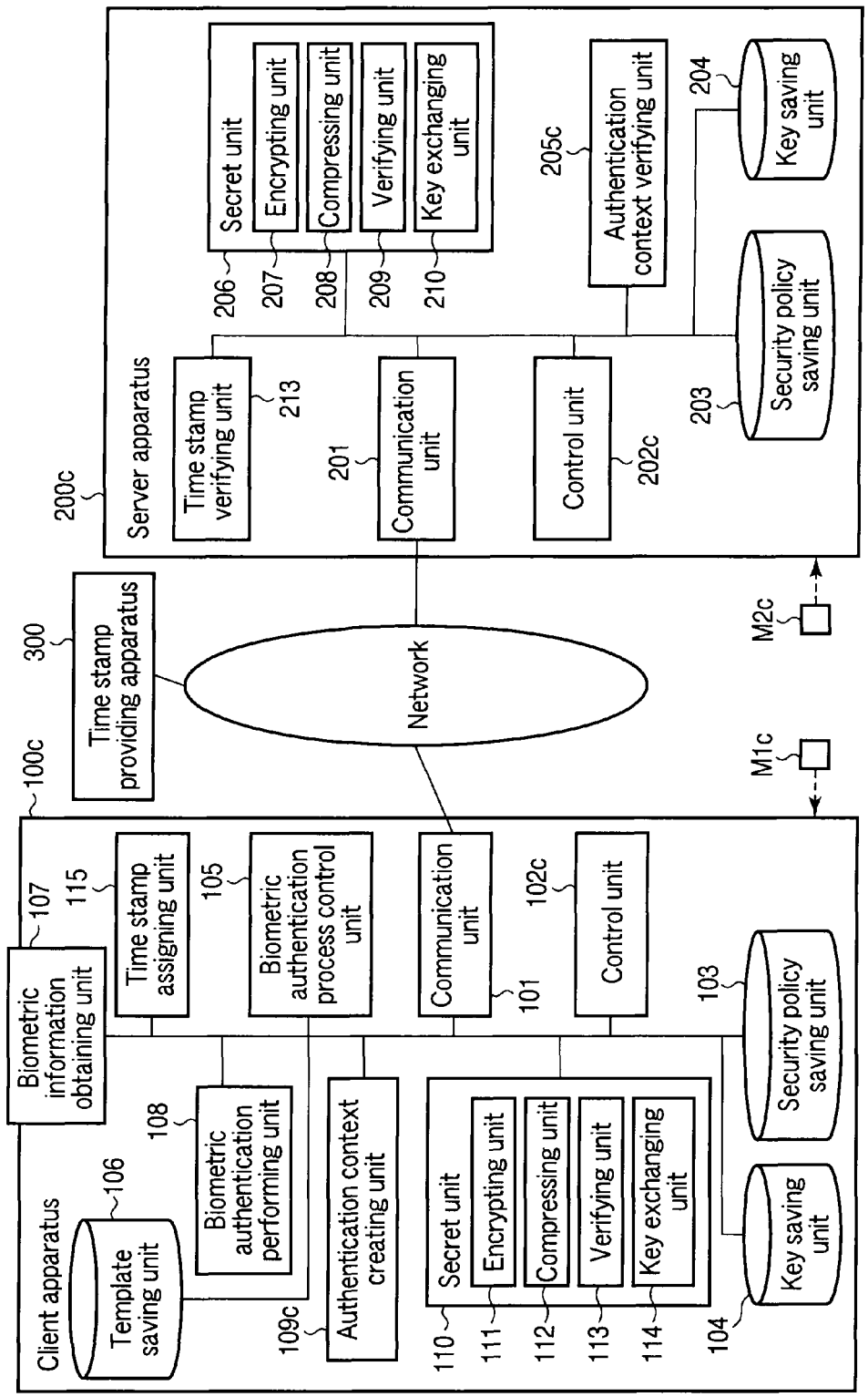
F I G. 20

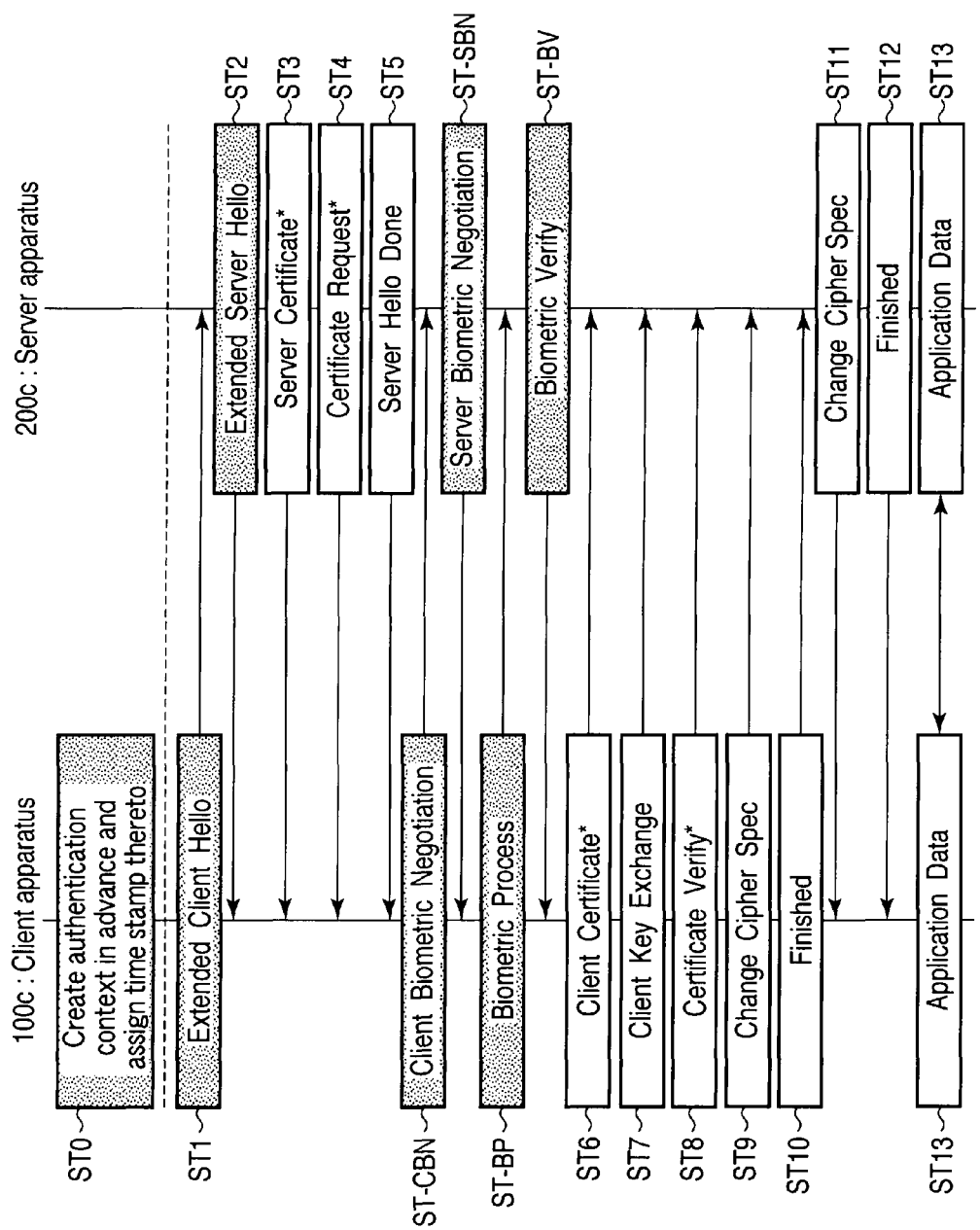
F I G. 21

CLIENT APPARATUS, SERVER APPARATUS, AND PROGRAM USING ENTITY AUTHENTICATION AND BIOMETRIC AUTHENTICATION

CROSS REFERENCE TO RELATED APPLICATIONS

This is a Continuation Application of PCT Application No. PCT/JP2008/063911, filed Aug. 1, 2008, which was published under PCT Article 21(2) in Japanese.

This application is based upon and claims the benefit of priority from prior Japanese Patent Application No. 2007-210904, filed Aug. 13, 2007, the entire contents of which are incorporated herein by reference.

BACKGROUND OF THE INVENTION

1. Field of the Invention

The present invention relates to a client apparatus, a server apparatus, and a program that establish a secure session. For example, the present invention relates to a client apparatus, a server apparatus, and a program that can establish a secure session based on entity authentication and biometric authentication without generating any unnecessary path associated with two handshakes.

2. Description of the Related Art

One of the protocols for performing cryptographic communication of information on a network is a TLS (Transport Layer Security) protocol. The TLS protocol is a technology that enables cryptographic communication of data by establishing a secure session after performing entity authentication (see, for example, T. Dierks, C. Allen, "The TLS Protocol Version 1.0", <URL: http://www.ietf.org/rfc/rfc2246.txt>).

Technologies related to TLS protocols include TLS Inner Application. The TLS Inner Application enables an extension process in Record Layer after establishing a secure session by TLS handshake (see, for example, P. Funk, S. Blake-Wilson, N. Smith, H. Tschofenig, T. Hardjono, "TLS Inner Application Extension (TLS/IA) draft-funk-tls-inner-application-extension-03.txt", <URL: http://tools.ietf.org/wg/tls/draft-funk-tls-inner-application-extension-03.txt>). In the TLS Inner Application, by performing biometric authentication by this extension process, entity authentication and biometric authentication can be performed (see, for example, Jpn. Pat. Appln. KOKAI Publication Nos. 2003-44436, 2006-11768 and 2003-224562, and S. Santesson, "TLS Handshake Message for Supplemental Data", <URL: http://www.ietf.org/rfc/rfc4680.txt>).

BRIEF SUMMARY OF THE INVENTION

According to research conducted by the present inventors, however, such TLS protocol or TLS Inner Application technologies as described above has room for improvement, as described below.

In the TLS protocol and TLS Inner Application technologies, when biometric authentication is performed after establishing a secure session by entity authentication, simple entity authentication and biometric authentication are performed. This merely involves performing two handshakes and thus there are unnecessary paths. Namely, the TLS protocol or TLS Inner Application technology still has room for improvement so that there may be no such unnecessary paths.

An object of the present invention is to provide a client apparatus, a server apparatus, and a program that can establish a secure session based on entity authentication and biometric authentication without generating any unnecessary paths associated with two handshakes.

First to fourth aspects of the present invention are targeted for a client apparatus and a server apparatus in which, before secret communication is performed over a network between the client apparatus which is operated by a user and the server apparatus, an agreement process including mutual certificate authentication is performed with the server apparatus, and when a result of the certificate authentication indicates valid, a session for performing the secret communication can be established.

A client apparatus according to the first aspect comprises: a biometric authentication device configured to perform biometric authentication on the user; a certificate storage device which stores a client certificate including a public key; a private key storage device which stores a private key associated with the public key; a biometric authentication method storage device which stores biometric authentication method information indicating a biometric authentication method of the biometric authentication device; a device configured to receive a message including a random number from the server apparatus during the agreement process; a device configured to create, after receiving the message, a biometric negotiation message including the biometric authentication method information and send the biometric negotiation message to the server apparatus; a device configured to activate, after sending the biometric negotiation message, the biometric authentication device based on biometric authentication method information notified from the server apparatus; a device configured to encrypt the random number based on the private key and thereby generate an encrypted random number; a device configured to generate an authenticator from information guaranteeing validity of a result of the biometric authentication by the biometric authentication device and a process thereof, the biometric authentication method information, the encrypted random number, and the client certificate, based on the private key; and a device configured to send to the server apparatus an authentication context including the information guaranteeing validity of a result of the biometric authentication and a process thereof, the biometric authentication method information, the encrypted random number, the client certificate, and the authenticator and thereby continue the agreement process.

A server apparatus according to the first aspect comprises: a biometric authentication method storage device which stores a plurality of pieces of biometric authentication method information indicating biometric authentication methods for the user which can be accepted; a device configured to send a message including a random number to the client apparatus during the agreement process; a device configured to receive, after sending the message, a biometric negotiation message including biometric authentication method information which indicates a biometric authentication method of the client apparatus, from the client apparatus; a device configured to determine whether the biometric authentication method information in the biometric negotiation message matches any of said plurality of pieces of biometric authentication method information in the biometric authentication method storage device; a device configured to notify, when a result of the determination indicates a match, the client apparatus of the biometric authentication method information; a device configured to receive, after the notification, an authentication context including information guaranteeing validity of a result of biometric authentication based on the biometric authentication method information and a process thereof, the biometric authentication method information, an encrypted random number, a client certificate, and an authenticator, from the client apparatus; a device configured to discontinue the agreement process when the result of biometric authentication in the authentication context indicates invalid; a device configured to discontinue the agreement process when the biometric authentication method information in the authentication context and the notified biometric authentication method information differ from each other; a device configured to discontinue the agreement process when the encrypted random number in the authentication context is decrypted based on a public key in the client certificate and a resulting random number differs from the random number in the message; and a device configured to discontinue the agreement process when the authenticator is verified based on the public key in the client certificate and a verification result indicates invalid.

In addition, a client apparatus according to the second aspect comprises: a biometric information obtaining device to obtain biometric information from the user during the agreement process; a biometric authentication method storage device which stores biometric authentication method information indicating a biometric authentication method of the biometric information obtaining device; a random number generation device to generate a first random number; a device configured to create a first message including the first random number and send the first message to the server apparatus during the agreement process; a device configured to receive, after sending the first message, a second message including a second random number from the server apparatus; a device configured to create a biometric negotiation message including the biometric authentication method information and send the biometric negotiation message to the server apparatus; a device configured to activate, after sending the biometric negotiation message, the biometric information obtaining device based on biometric authentication method information notified from the server apparatus; a device configured to generate an encryption parameter by a hash algorithm, based on the first random number and the second random number; and a device configured to encrypt the biometric information obtained by the biometric information obtaining device, based on the encryption parameter and notify the server apparatus of resulting encrypted biometric information and thereby continue the agreement process.

A server apparatus according to the second aspect comprises: a biometric authentication method storage device which stores a plurality of pieces of biometric authentication method information indicating biometric authentication methods for the user which can be accepted; a biometric reference information storage device which stores biometric reference information of the user; a device configured to receive a first message including a first random number from the client apparatus during the agreement process; a device configured to send, after receiving the first message, a second message including a second random number to the client apparatus; a device configured to receive from the client apparatus a biometric negotiation message including biometric authentication method information indicating a biometric authentication method of the client apparatus; a device configured to determine whether the biometric authentication method information in the biometric negotiation message matches any of said plurality of pieces of biometric authentication method information in the biometric authentication method storage device; a device configured to notify, when a result of the determination indicates a match, the client apparatus of the biometric authentication method information; a device configured to receive, after the notification, encrypted biometric information from the client apparatus, the encrypted biometric information being obtained by encrypting biometric information of the user which is obtained according to the biometric authentication method information, based on the first random number and the second random number; a device configured to generate an encryption parameter by a hash algorithm, based on the first random number in the first message and the second random number in the second message; a device configured to decrypt the encrypted biometric information based on the encryption parameter; a biometric authentication device which performs biometric authentication on biometric information which is obtained as a result of the decryption, based on the biometric reference information in the biometric reference information storage device; and a device configured to discontinue the agreement process when a result of the biometric authentication indicates invalid.

Furthermore, a client apparatus according to the third aspect comprises: a biometric authentication device to perform biometric authentication on the user; a certificate storage device which stores a client certificate including a public key; a private key storage device which stores a private key associated with the public key; a device configured to send, during the agreement process, a first message including a fact that the client certificate is to be obtained based on a result of the biometric authentication of the user, to the server apparatus; a device configured to receive, after sending the first message, a second message including a random number from the server apparatus; a device configured to activate the biometric authentication device after receiving the second message; a device configured to encrypt the random number based on the private key and thereby generate an encrypted random number; a device configured to send the client certificate in the certificate storage device to the server apparatus when a result of the biometric authentication by the biometric authentication device indicates valid; a device configured to generate an authenticator from information guaranteeing validity of the result of the biometric authentication and a process thereof and the encrypted random number, based on the private key; and a device configured to send to the server apparatus an authentication context including the information guaranteeing validity of the result of the biometric authentication and a process thereof, the encrypted random number, and the authenticator and thereby continue the agreement process.

A server apparatus according to the third aspect comprises: a device configured to receive, during the agreement process, a first message including a fact that a client certificate is to be obtained based on a result of biometric authentication of the user, from the client apparatus; a device configured to send, after receiving the first message, a second message including a random number to the client apparatus; a device configured to receive, after sending the second message, a client certificate from the client apparatus; a device configured to receive, after sending the second message, an authentication context including information guaranteeing validity of a result of biometric authentication of the user and a process thereof, an encrypted random number, and an authenticator, from the client apparatus; a storage device which stores the received client certificate and authentication context; a device configured to discontinue the agreement process when the result of biometric authentication in the authentication context stored in the storage device indicates invalid; a device configured to discontinue the agreement process when the encrypted random number in the authentication context stored in the storage device is decrypted based on a public key in the client certificate and a resulting random number differs from the random number in the second message; and a device configured to discontinue the agreement process when the authenticator is verified based on the public key in the client certificate stored in the storage device and a verification result indicates invalid.

In addition, a client apparatus according to the fourth aspect comprises: a certificate storage device which stores a client certificate including a public key; a private key storage device which stores a private key associated with the public key; a biometric authentication device to perform biometric authentication on the user before the agreement process; a biometric authentication method storage device which stores biometric authentication method information indicating a biometric authentication method of the biometric authentication device; a device configured to generate an authenticator from information guaranteeing validity of a result of the biometric authentication and a process thereof, the biometric authentication method information, and the client certificate, based on the private key; a device configured to create, before the agreement process, an authentication context including the information guaranteeing validity of a result of the biometric authentication and a process thereof, the biometric authentication method information, the client certificate, and the authenticator; a device configured to send, before the agreement process, the authentication context to a time stamp providing apparatus; a device configured to receive from the time stamp providing apparatus an authentication context assigned a time stamp by assigning the time stamp to the sent authentication context and date and time information in the time stamp providing apparatus, the time stamp being generated based on a private key of the time stamp providing apparatus; a device configured to create, during the agreement process, a biometric negotiation message including the biometric authentication method information and send the biometric negotiation message to the server apparatus; and a device configured to send, after sending the biometric negotiation message, the authentication context assigned a time stamp to the server apparatus based on biometric authentication method information notified from the server apparatus and thereby continue the agreement process.

A server apparatus according to the fourth aspect comprises: a biometric authentication method storage device which stores a plurality of pieces of biometric authentication method information indicating biometric authentication methods for the user which can be accepted; a device configured to receive, during the agreement process, a biometric negotiation message including biometric authentication method information indicating a biometric authentication method of the client apparatus, from the client apparatus; a device configured to determine whether the biometric authentication method information in the biometric negotiation message matches any of said plurality of pieces of biometric authentication method information in the biometric authentication method storage device; a device configured to notify, when a result of the determination indicates a match, the client apparatus of the biometric authentication method information; a device configured to receive, after the notification, an authentication context which is assigned a time stamp based on a private key of a time stamp providing apparatus and which includes a result of biometric authentication of the user, biometric authentication method information, a client certificate, and an authenticator, from the client apparatus; a device configured to discontinue the agreement process when the result of biometric authentication in the authentication context indicates invalid; a device configured to discontinue the agreement process when the biometric authentication method information in the authentication context differs from the notified biometric authentication method; a device configured to discontinue the agreement process when the authenticator is verified based on a public key in the client certificate and a verification result indicates invalid; and a device configured to discontinue the agreement process when the time stamp is decrypted based on a public key associated with the private key of the time stamp providing apparatus and a difference between resulting date and time information and current date and time information is greater than a predetermined value.

Each of the above aspects is described with regard to an "apparatus" but may be described with regard not only to an "apparatus" but also to a "method", "program", or "computer-readable storage medium which stores a program".

In each of the first to fourth aspects, by a configuration in which biometric authentication is also performed during an agreement process including certificate authentication, a secure session based on entity authentication and biometric authentication can be established without generating any unnecessary paths associated with two handshakes. In addition, even when biometric authentication fails, the number of processes that are wasted can be reduced as compared with conventionally.

In the first aspect, in addition to the aforementioned actions, by a configuration in which an authentication context including an encrypted random number which is generated from a random number included in a message exchanged during an agreement process is sent to the server apparatus, an agreement process including certificate authentication and biometric authentication are organically combined together, and thus, the occurrence of communication associated with the biometric authentication can be suppressed.

In the second aspect, in addition to the aforementioned actions, by a configuration in which biometric information is encrypted based on a first random number and a second random number which are respectively included in messages exchanged during an agreement process and the encrypted biometric information is sent to the server apparatus, while an agreement process including certificate authentication and biometric authentication are organically combined together, biometric authentication by server matching can be implemented.

In the third aspect, in addition to the aforementioned actions, by a configuration in which a first message including the fact that a client certificate is to be obtained based on a result of user's biometric authentication is sent to the server apparatus, the server apparatus can verify that a secure session is established using a client certificate obtained based on biometric authentication.

In the fourth aspect, in addition to the aforementioned actions, by a configuration in which an authentication context assigned a time stamp is created before an agreement process, and during the agreement process the authentication context assigned a time stamp is sent to the server apparatus, a secure session can be established based on an authentication context which is created in advance, without discontinuing an agreement process. In addition, by a time stamp assigned to an authentication context, replay attacks can be prevented.

BRIEF DESCRIPTION OF THE SEVERAL VIEWS OF THE DRAWING

FIG. 1 is a schematic diagram illustrating a configuration of an authentication system according to a first embodiment of the present invention.

FIG. 3 is a schematic diagram for describing an authentication context in the first embodiment.

FIG. 7 is a schematic diagram illustrating a configuration of a Client Hello message in the first embodiment.

FIG. 8 is a schematic diagram illustrating an example of an Extension list of the Client Hello message in the first embodiment.

FIG. 9 is a schematic diagram illustrating a configuration of a Server Hello message in the first embodiment.

FIG. 11 is a schematic diagram illustrating a configuration of a Client Biometric Negotiation message in the first embodiment.

FIG. 12 is a schematic diagram illustrating a configuration of a Server Biometric Negotiation message in the first embodiment.

FIG. 13 is a schematic diagram illustrating a configuration of a Biometric Process message in the first embodiment.

FIG. 14 is a schematic diagram illustrating a configuration of a Biometric Verify message in the first embodiment.

FIG. 15 is a schematic diagram illustrating a configuration of an authentication system according to a second embodiment of the present invention.

FIG. 16 is a sequence diagram for describing operations in the second embodiment.

FIG. 18 is a schematic diagram for describing an authentication context in the third embodiment.

FIG. 20 is a schematic diagram illustrating a configuration of an authentication system according to a fourth embodiment of the present invention.

FIG. 21 is a sequence diagram for describing operations in the fourth embodiment.

DETAILED DESCRIPTION OF THE INVENTION

Figure 2:
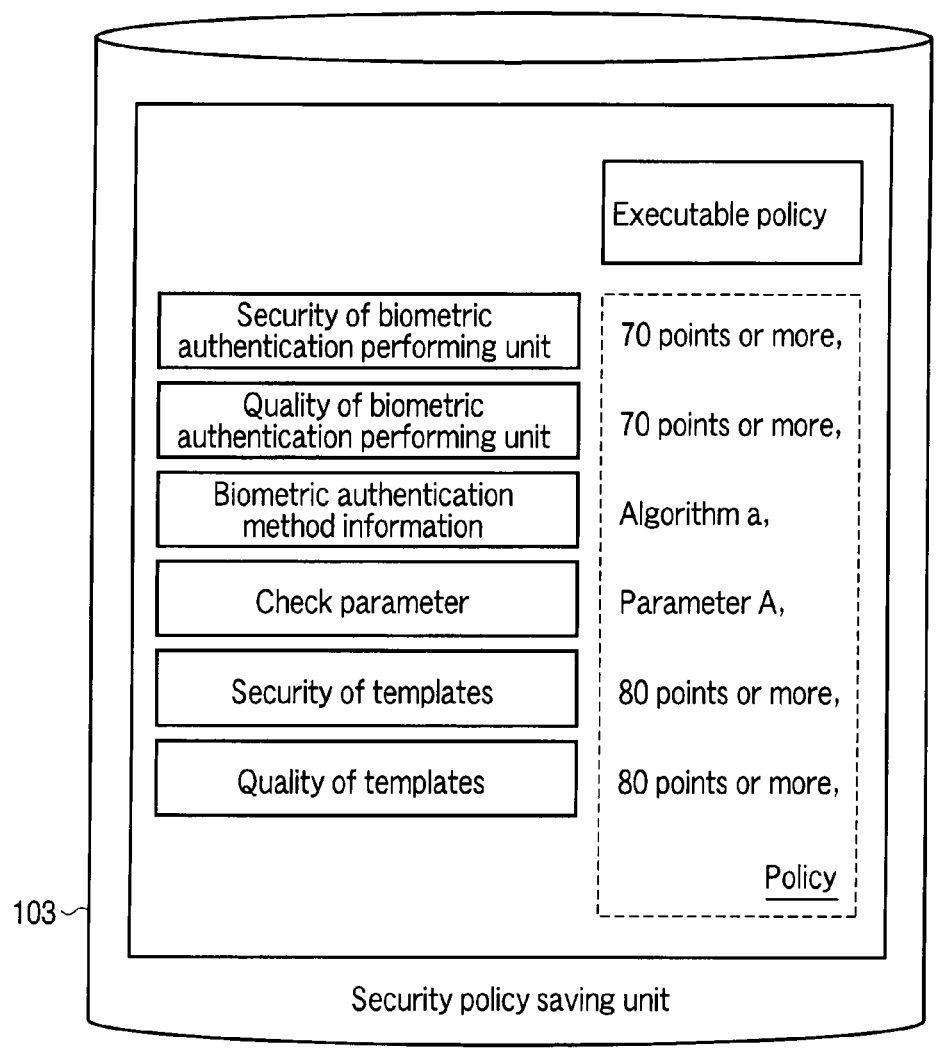
FIG. 2 is a schematic diagram for describing a security policy in the first embodiment.

Embodiments of the present invention will be described below using the drawings. Before that, a summary of TLS handshake (RFC) messages on which the embodiments are premised will be described.

TLS handshake messages are communicated in the order of Client Hello, Server Hello, Server Certificate (optional), Certificate Request (optional), Server Hello Done, Client Certificate (optional), Client Key Exchange, Certificate Verify (optional), Change Cipher Spec, Finished, Change Cipher Spec, and Finished.

A Client Hello message is sent when a client establishes a connection with a server for the first time or when a Hello Request is received from the server. In the Client Hello message, lists of cipher suites and compression algorithms to be used are stored. When an existing session is resumed, a session ID is also stored. When the Client Hello message is sent, the client waits for a Server Hello message which is sent from the server side.

A Server Hello message includes specification of which ones in the lists of cipher suites and compression algorithms sent from the client are to be used. When a session ID is also sent and the server gives permission, the existing session is resumed.

A Server Certificate message (optional) includes a certificate of the server itself (a format defined in CCITT recommendation X.509) and is sent to the client from the server. It is sent thereto in a format including a list of all certificates up to a root certificate authority.

A Certificate Request message (optional) is sent when the server requests presentation of a client certificate. This message is added with a list of certificate authorities trusted by the server.

A Server Hello Done message is sent to the client when a series of transmission and reception of Hello messages have completed successfully. Thereafter, the server waits for a message from the client.

A Client Certificate message (optional) is sent when a Certificate Request is received from the server. If there is no certificate that meets a request from the server, then a no_certificate Alert is returned. The data format is the same as that of the Server Certificate.

In a Client Key Exchange message, premaster secret data which is generated by a cipher suite agreed by the Client Hello and the Server Hello is encrypted and sent. The premaster secret data is data, based on which is generated a master secret which is used when generating a session key to be used for encryption.

A Certificate Verify message (optional) is sent including a signature which is generated through the exchange of messages so far between the client and the server, to the server when a client certificate is being sent. Specifically, a hash value of data exchanged so far which is encrypted with a client side's private key is sent. The server decrypts the certificate received from the client with a client side's public key and compares the certificate with the obtained hash value to verify the signature.

A Change Cipher Spec message is a message declared by the client that communication is performed by the cipher suite agreed by both parties.

A Finished message is a message telling the server from the client that the exchange with the server is completed normally and data required to establish a session is prepared.

A Change Cipher Spec message is a message declared by the server that communication is performed by the cipher suite agreed by both parties.

A Finished message is a message telling the client from the server that the exchange with the client is completed normally and data required to establish a session is prepared.

The above is a summary of TLS handshake. Subsequently, the embodiments of the present invention will be described. In each of the following embodiments, for each apparatus, either a hardware configuration or a combined configuration of hardware resources and software can be implemented. For software in a combined configuration, as illustrated in FIGS. 1, 15, 17, and 20, a program is used which is installed in advance on a computer of a corresponding apparatus over a network or from storage media M1, M2, M1a to M1c, and M2a to M2c to implement the functionality of the corresponding apparatus.

First Embodiment

FIG. 1 is a schematic diagram illustrating a configuration of an authentication system according to a first embodiment of the present invention. The authentication system is configured by a client apparatus 100 and a server apparatus 200 which can communicate with each other over a network such as the Internet.

The client apparatus 100 includes a communication unit 101, a control unit 102, a security policy saving unit 103, a key saving unit 104, a biometric authentication process control unit 105, a template saving unit 106, a biometric information obtaining unit 107, a biometric authentication performing unit 108, an authentication context creating unit 109, a secret unit 110, an encrypting unit 111, a compressing unit 112, a verifying unit 113, and a key exchanging unit 114.

The communication unit 101 has the function of performing, by control of the control unit 102, transmission and reception of data with the server apparatus 200 over the Internet.

The control unit 102 has, in addition to a known message control function performed during an agreement process, the function of controlling the units 101 and 103 to 114 to control messages related to biometric authentication during the agreement process. The details of each message will be described later.

Specifically, the control unit 102 has the following functions (f102-1) to (f102-5) in addition to the known message control function.

(f102-1) The function of receiving, during an agreement process, a Server Hello message including random number from the server apparatus 200 through the communication unit 101.

(f102-2) The function of creating, after receiving the Server Hello message, a Biometric Negotiation message including biometric authentication method information, and sending the Biometric Negotiation message to the server apparatus 200.

(f102-3) The function of activating, after sending the Biometric Negotiation message, the biometric authentication process control unit 105 based on biometric authentication method information notified from the server apparatus 200.

(f102-4) The function of encrypting, by the encrypting unit 111, the random number in the Server Hello message based on a client's private key and thereby generating an encrypted random number.

(f102-5) The function of sending an authentication context received from the authentication context creating unit 109, to the server apparatus 200 through the communication unit 101 and thereby continuing the agreement process.

The security policy saving unit 103 is a storage apparatus from/to which the control unit 102 can read/write. In the security policy saving unit 103, a security policy for biometric authentication is saved in advance, in addition to a known security policy for secret communication.

For a security policy, as illustrated in FIG. 2, for example, as an executable policy, the security of the biometric authentication performing unit 108, the quality of the biometric authentication performing unit 108, biometric authentication method information indicating a biometric authentication method, a check parameter, the security of templates, and the quality of templates are described.

The key saving unit 104 is a storage apparatus from/to which the control unit 102, the secret unit 110, and the authentication context creating unit 109 can read/write. In the key saving unit 104, a client certificate including a public key of the client apparatus 100 and a private key associated with the public key are saved.

The biometric authentication process control unit 105 has the following functions (f105-1) and (f105-2).

(f105-1) The function of controlling, by control of the control unit 102, the template saving unit 106, the biometric information obtaining unit 107, and the biometric authentication performing unit 108 to perform a biometric authentication process.

(f105-2) The function of sending out an obtained result of biometric authentication to the authentication context creating unit 109.

The template saving unit 106 has the function of storing biometric information (templates) of users registered in advance and outputting the templates to the biometric authentication performing unit 108 in response to a request from the biometric authentication process control unit 105.

The biometric information obtaining unit 107 has the function of obtaining, by control of the biometric authentication process control unit 105, biometric information of a user and outputting the biometric information to the biometric authentication performing unit 108.

The biometric authentication performing unit 108 has the function of performing, by control of the biometric authentication process control unit 105, a biometric authentication process based on biometric information received from the biometric information obtaining unit 107 and the templates in the template saving unit 106 and outputting a result of biometric authentication to the biometric authentication process control unit 105.

The authentication context creating unit 109 has the following functions (f109-1) and (f109-2).

(f109-1) The function of generating an authenticator (digital signature) from information guaranteeing the validity of a result of biometric authentication obtained by the biometric authentication process control unit 105 and a process thereof, biometric authentication method information, an encrypted random number, and a client certificate, based on the client's private key.

(f109-2) The function of sending out an authentication context including the result of biometric authentication, the biometric authentication method information, the encrypted random number, the client certificate, and the authenticator, to the control unit 102.

An example of the authentication context may be an authentication context including a general context g and a specific context p, as illustrated in FIG. 3. The general context g includes a header block gh and an authenticator block ga for gh. The specific context p includes a header block ph, a data block pd, a client certificate block pc, and an authenticator block ga for ph, pd, and pc. The header block gh in the general context g includes header information which can uniquely identify the header block ph in the specific context. The data block pd includes, for example, a result of biometric authentication, biometric authentication method information, and an encrypted random number.

The secret unit 110 performs, by control of the control unit 102, a secret process for a key. Specifically, the secret unit 110 includes the encrypting unit 111, the compressing unit 112, the verifying unit 113, and the key exchanging unit 114. The functional blocks of the secret unit 110 may not be used, such as when not selected as an option in an agreement process. The same also applies to each of the following embodiments.

The encrypting unit 111 has the function of encrypting, when receiving a key and data from the control unit 102, the data based on the key and sending out the resulting encrypted data to the control unit 102. Also, the encrypting unit 111 has the function of generating a pseudo-random number by a pseudo-random function (PRF).

The compressing unit 112 has the function of compressing data received from the control unit 102 and sending out the resulting compressed data to the control unit 102.

The verifying unit 113 has the function of verifying, when receiving a key and data from the control unit 102, the data based on the key and sending out a verification result to the control unit 102.

The key exchanging unit 114 has the function of performing, when receiving a key and data from the control unit 102, a key exchange process based on the key and the data and sending out an obtained result of the process to the control unit 102.

Meanwhile, the server apparatus 200 includes a communication unit 201, a control unit 202, a security policy saving unit 203, a key saving unit 204, an authentication context verifying unit 205, a secret unit 206, an encrypting unit 207, a compressing unit 208, a verifying unit 209, and a key exchanging unit 210.

The communication unit 201 has the function of performing, by control of the control unit 202, transmission and reception of data with the client apparatus 100 over the Internet.

The control unit 202 has, in addition to a known message control function, the function of controlling the units 201 and 203 to 210 to control messages related to biometric authentication during an agreement process. The details of each message will be described later.

Specifically, the control unit 202 has the following functions (f202-1) to (f202-6) in addition to the known message control function.

(f202-1) The function of sending, during an agreement process, a message including a random number to the client apparatus 100 through the communication unit 201.

(f202-2) The function of receiving, after sending the message, a Biometric Negotiation message including biometric authentication method information which indicates a biometric authentication method of the client apparatus 100, from the client apparatus 100 through the communication unit 201.

(f202-3) The function of determining whether the biometric authentication method information in the Biometric Negotiation message matches any of pieces of biometric authentication method information in the security policy saving unit 203.

(f202-4) The function of notifying, when a result of the determination indicates a match, the client apparatus 100 of the biometric authentication method information through the communication unit 201.

(f202-5) The function of receiving, after the notification, an authentication context including information guaranteeing the validity of a result of biometric authentication based on the biometric authentication method information and a process thereof, the biometric authentication method information, an encrypted random number, a client certificate, and an authenticator, from the client apparatus 100 through the communication unit 201.

(f202-6) The function of sending out the authentication context to the authentication context verifying unit 205 and continuing or discontinuing the agreement process according to a verification result received from the authentication context verifying unit 205.

The security policy saving unit 203 is a storage apparatus from/to which the control unit 202 can read/write. In the security policy saving unit 203, security policies for biometric authentication are saved in advance, in addition to a known security policy for secret communication.

Figure 4:
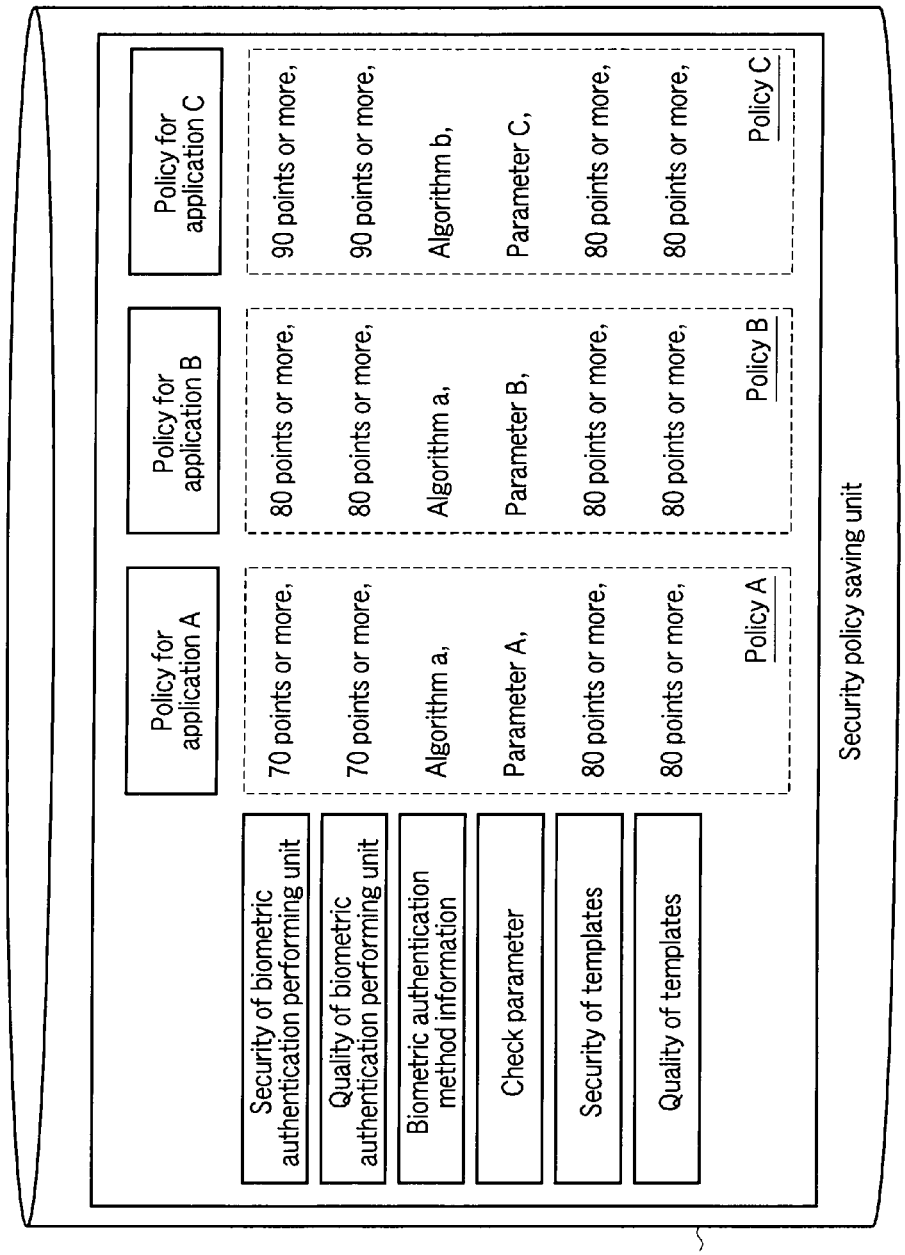
FIG. 4 is a schematic diagram for describing security policies in the first embodiment.
Figure 5:
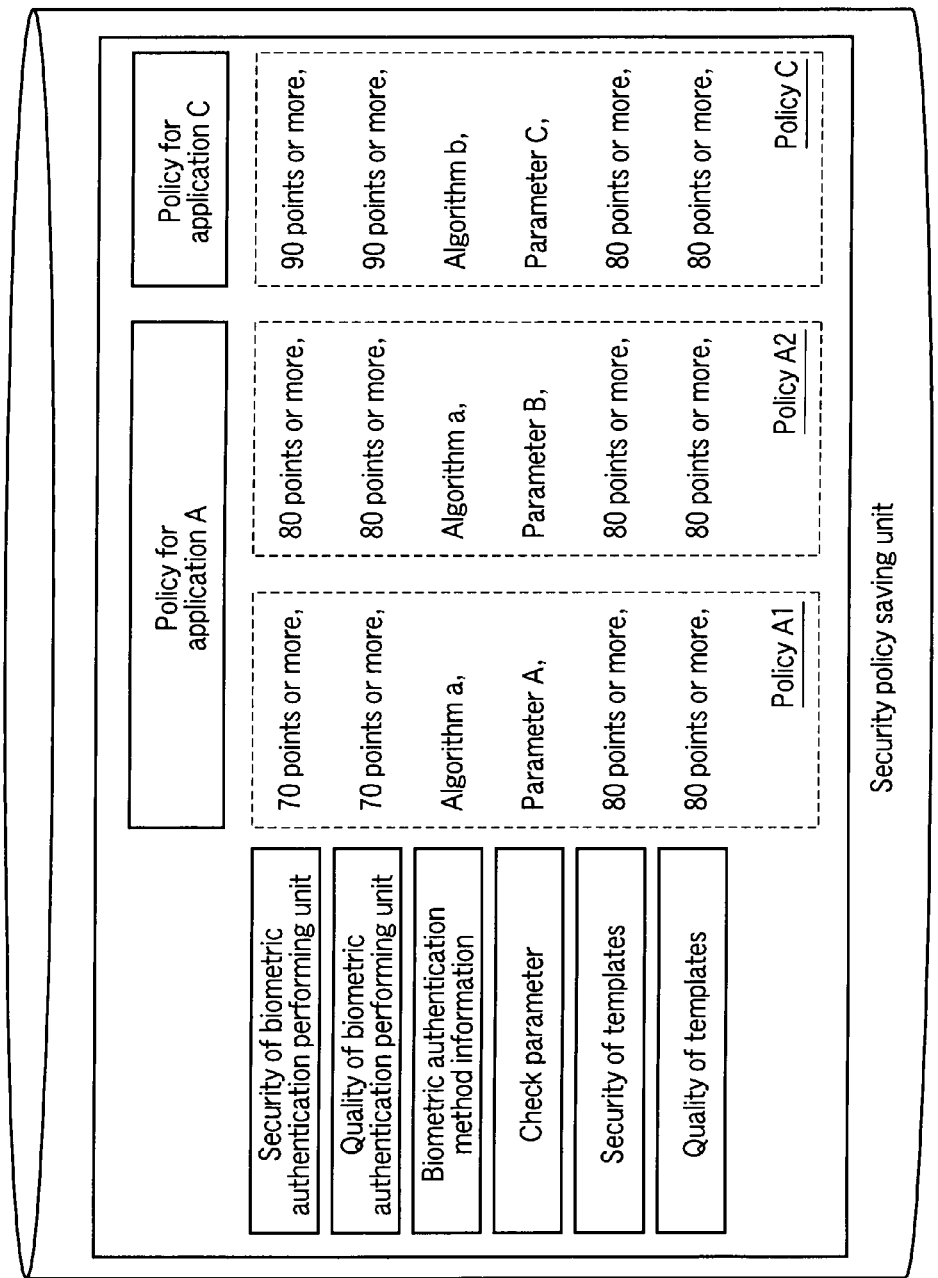
FIG. 5 is a schematic diagram for describing security policies in the first embodiment.

For security policies, as illustrated in FIG. 4, for example, acceptable policies are listed for respective applications (at step ST13 which will be described later). In each policy, the security of the biometric authentication performing unit, the quality of the biometric authentication performing unit, biometric authentication method information indicating a biometric authentication method, a check parameter, the security of templates, and the quality of templates are described. Alternatively, for security policies, as illustrated in FIG. 5, for example, there may be a plurality of acceptable policies for each application (at step ST13 which will be described later).

The key saving unit 204 is a storage apparatus from/to which the control unit 202 and the secret unit 206 can read/write. In the key saving unit 204, a server certificate including a public key of the server apparatus 200 and a private key associated with the public key are saved.

The authentication context verifying unit 205 has the function of sending out to the control unit 202 a verification result indicating the discontinuation of the agreement process when any of the following (i) to (iv) applies; and the function of sending out to the control unit 202 a verification result indicating the continuation of the agreement process when none of (i) to (iv) apply.

(i) The case in which the result of biometric authentication in the authentication context indicates invalid.

(ii) The case in which the biometric authentication method information in the authentication context and the notified biometric authentication method information differ from each other.

(iii) The case in which the encrypted random number in the authentication context is decrypted based on the public key in the client certificate and the resulting random number differs from the random number in the message.

(iv) The case in which the authenticator is verified based on the public key in the client certificate and a verification result indicates invalid.

The secret unit 206 performs, by control of the control unit 202, a secret process for a key. Specifically, the secret unit 206 includes the encrypting unit 207, the compressing unit 208, the verifying unit 209, and the key exchanging unit 210. The functional blocks of the secret unit 206 may not be used, such as when not selected as an option in an agreement process. The same also applies to each of the following embodiments.

The encrypting unit 207 has the function of encrypting, when receiving a key and data from the control unit 202, the data based on the key and sending out the resulting encrypted data to the control unit 202. Also, the encrypting unit 207 has the function of generating a pseudo-random number by a pseudo-random function (PRF).

The compressing unit 208 has the function of compressing data received from the control unit 202 and sending out the resulting compressed data to the control unit 202.

The verifying unit 209 has the function of verifying, when receiving a key and data from the control unit 202, the data based on the key and sending out a verification result to the control unit 202.

The key exchanging unit 210 has the function of performing, when receiving a key and data from the control unit 202, a key exchange process based on the key and the data and sending out an obtained result of the process to the control unit 202.

Figure 6:
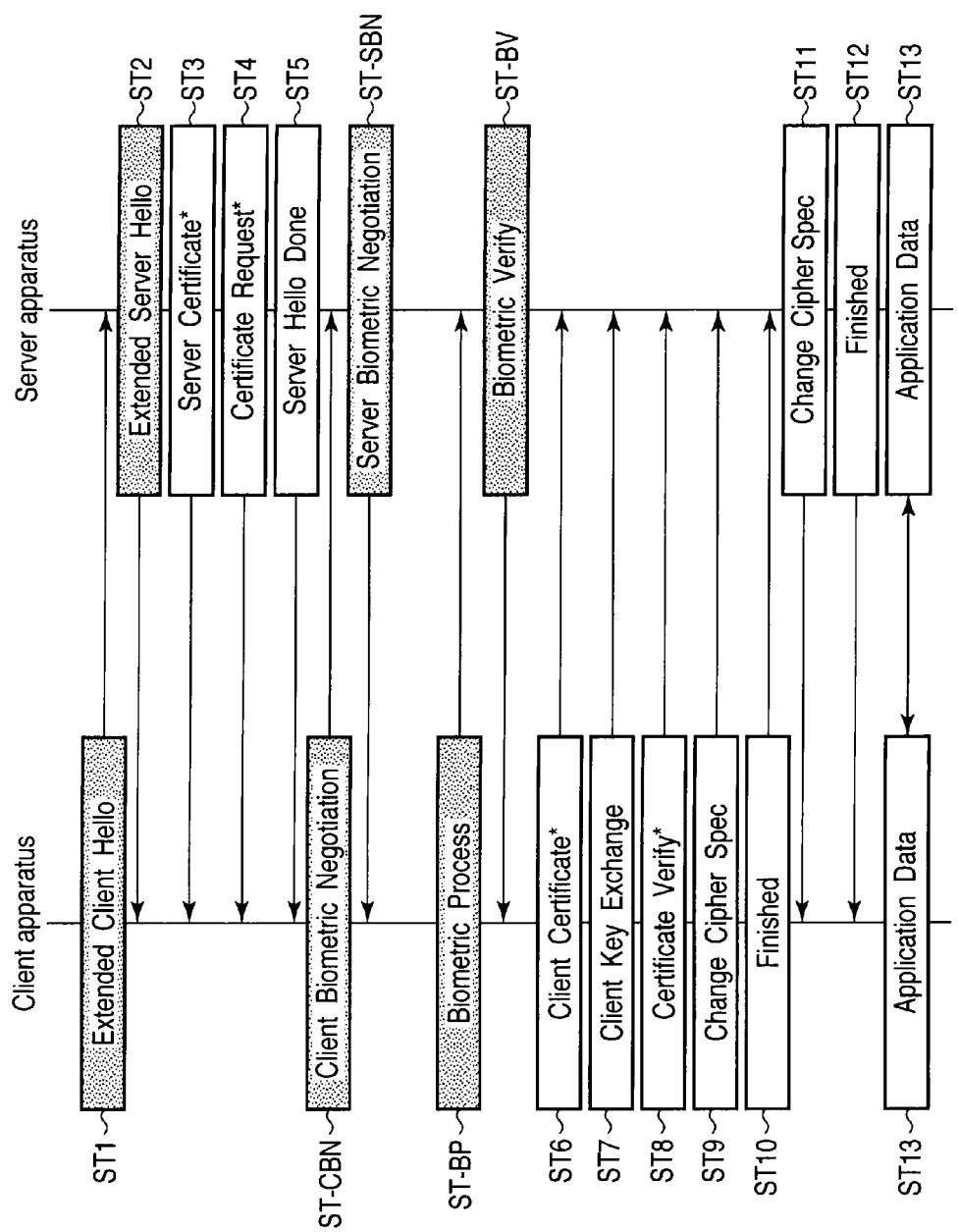
FIG. 6 is a sequence diagram for describing operations in the first embodiment.

Next, the operations of the authentication system configured in the above-described manner will be described using a sequence diagram in FIG. 6. The sequence diagram represents a handshake protocol for secret communication. Steps ST3 to ST5 and ST6 to 13 other than those steps (ST1, ST2, ST-CBN, ST-SBN, ST-BP, and ST-BV) indicated by shading in the drawing are the same as those known in the art and thus detailed description thereof is omitted. The same also applies to each of the following embodiments.

(Step ST1)

In the client apparatus 100, to notify that there is a handshake extension process, the control unit 102 sends a Client Hello message $M_{CH}$ which is an extended version of a conventional Hello message, to the server apparatus 200 through the communication unit 101.

The Client Hello message $M_{CH}$ includes, as illustrated in FIG. 7, Protocol Version of the client, Random generated by the client apparatus 100, Session ID, Cipher Suite that can be performed by the client apparatus 100, Compression Method that can be performed by the client apparatus 100, and Extension list $M_{CH-LIST}$ indicating that the extension process is performed by this handshake. The Extension list $M_{CH-LIST}$ includes, for example, as illustrated in FIG. 8, Extension Type including Client_auth based on biometric authentication; and Extension Method including unit 8 Authentication Method [2].

The content notified by the Extension list $M_{CH-LIST}$ indicates that client authentication is performed based on biometric authentication and a secure session is established according to a result of the client authentication. Other details are the same as those known in the art and thus are omitted.

(Step ST2)

In the server apparatus 200, the control unit 202 receives the Client Hello message $M_{CH}$ through the communication unit 201. To notify the acceptance of the handshake extension process, the control unit 202 sends an extended Server Hello message $M_{SH}$ to the client apparatus 100 through the communication unit 201.

The Server Hello message $M_{SH}$ includes, as illustrated in FIG. 9, Protocol Version of the server apparatus 200, Random generated by the server apparatus 200, Session ID, Cipher Suite agreed by the server apparatus 200, Compression Method agreed by the server apparatus 200, and Extension indicating that the extension process is performed by this handshake.

Other details are the same as those known in the art and thus are omitted.

(Step ST3)

In the server apparatus 200, to perform server authentication and to send data required for key exchange with the client apparatus 100, the control unit 202 sends a Server Certificate message including the server certificate in the key saving unit 204, to the client apparatus 100 through the communication unit 201. When the server certificate does not include data that is required for key exchange with the client apparatus 100, the control unit 202 sends a Server Certificate message, followed by a Server Key Exchange message to the client apparatus 100 through the communication unit 201.

Figure 10:
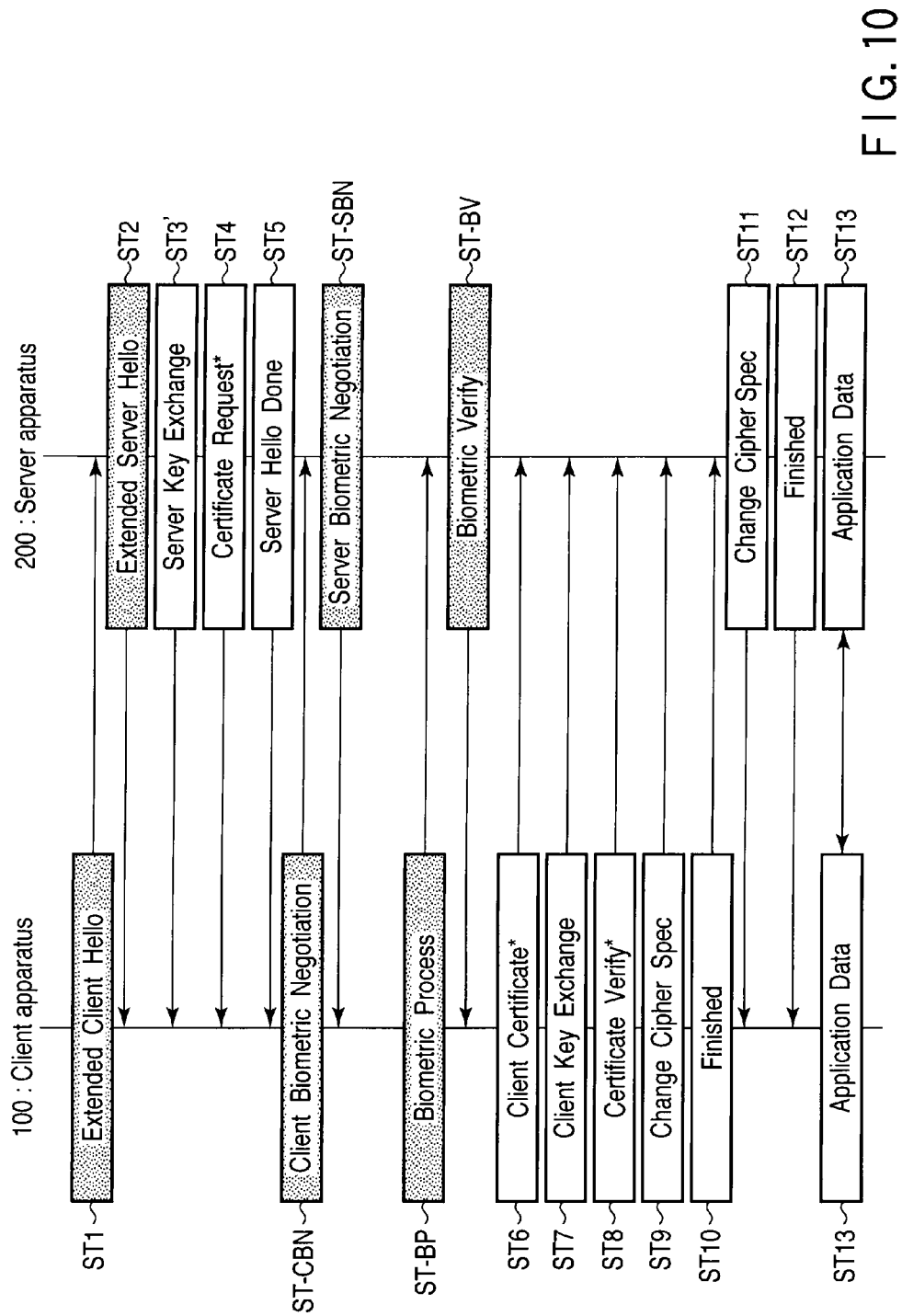
FIG. 10 is a sequence diagram illustrating a modification of operations in the first embodiment.

If server authentication is not performed, then, as illustrated in FIG. 10, a Server Key Exchange message is sent to the client apparatus 100 without sending a Server Certificate message.

(Step ST4)

In the server apparatus 200, the control unit 202 sends, if selected as an option, a Certificate Request message requesting a client certificate, to the client apparatus 100 through the communication unit 201.

(Step ST5)

In the server apparatus 200, the control unit 202 sends a Server Hello Done message indicating that a series of processes for Hello messages have completed, to the client apparatus 100 through the communication unit 201.

(Step ST-CBN)

In the client apparatus 100, to notify the server of a list of biometric authentication methods that can be performed by the client apparatus 100, the control unit 102 sends a Client Biometric Negotiation message $M_{CBN}$ to the server apparatus 200 through the communication unit 101.

The Client Biometric Negotiation message $M_{CBN}$ includes, as illustrated in FIG. 11, Biometric Method List in which biometric authentication method information indicating a biometric authentication method that can be performed by the client apparatus 100 is listed.

(Step ST-SBN)

In the server apparatus 200, when the control unit 202 receives the Client Biometric Negotiation message through the control unit 202, the control unit 202 determines whether the biometric authentication method information in the biometric authentication method list in the Client Biometric Negotiation message matches any of the pieces of biometric authentication method information in the security policy saving unit 203.

When a result of the determination indicates a match, the control unit 202 sends a Server Biometric Negotiation message $M_{SBN}$ including the biometric authentication method information to the client apparatus 100 through the communication unit 201. There may be a plurality of selected methods.

The Server Biometric Negotiation message $M_{SBN}$ includes, as illustrated in FIG. 12, Biometric Method List in which biometric authentication method information indicating a biometric authentication method that satisfies the security policies in the security policy saving unit 203 is listed.

(Step ST-BP)

In the client apparatus 100, when the client unit 102 receives the Server Biometric Negotiation message through the communication unit 101, the control unit 102 activates the biometric authentication process control unit 105 based on the biometric authentication method information in the Server Biometric Negotiation message. The biometric authentication process control unit 105 controls the units 106 to 108 to perform a user biometric authentication process and sends out an obtained result of biometric authentication to the authentication context creating unit 109.

Also, the control unit 102 encrypts, by the encrypting unit 111, the Random included in the Server Hello message $M_{SH}$, based on the private key in the key saving unit 104 and thereby generates an encrypted random number. The encrypted random number is sent out to the authentication context creating unit 109 from the control unit 102.

The authentication context creating unit 109 generates an authenticator from the result of biometric authentication, the biometric authentication method information, the encrypted random number, and the client certificate in the key saving unit 104, based on the private key in the key saving unit 104.

Thereafter, the authentication context creating unit 109 creates an authentication context including various information to guarantee the validity of the result of biometric authentication and the biometric authentication process, such as obtained biometric information (sample), biometric information (templates) referred to, and a certificate of the biometric information referred to (template certificate), the biometric authentication method information, the encrypted random number, the client certificate, and the authenticator, and sends out the authentication context to the control unit 102.

The control unit 102 sends a Biometric Process message $M_{BP}$ including the authentication context to the server apparatus 200 through the communication unit 101. By this, the agreement process continues.

The Biometric Process message $M_{BP}$ includes, as illustrated in FIG. 13, Authentication Result, which is a result of biometric authentication performed by the client. The Authentication Result includes, for example, an authentication method selected by the client apparatus 100 from authentication methods presented by the server; and authentication result data. In the present embodiment, it is only necessary to include the above-described authentication context in Extension Data.

For a method of generating challenge data, in addition to the use of a challenge included in a Server Hello message, a random number may be generated by a Cipher Suite which is agreed by a Client Hello message and a Server Hello message, using a known technique and the random number may be used as challenge data.

(Step ST-BV)

In the server apparatus 200, when the control unit 202 receives the Biometric Process message $M_{BP}$ through the communication unit 201, the control unit 202 sends out the authentication context in the Biometric Process message $M_{BP}$ to the authentication context verifying unit 205.

The authentication context verifying unit 205 verifies the authentication context and sends out a verification result to the control unit 202. The control unit 202 continues or discontinues the agreement process according to the verification result of the authentication context. A verification result for discontinuing the agreement process includes, for example, (i) the case in which the result of biometric authentication in the authentication context indicates invalid, (ii) the case in which the biometric authentication method information in the authentication context and the notified biometric authentication method information differ from each other, (iii) the case in which the encrypted random number in the authentication context is decrypted based on the public key in the client certificate and the resulting random number differs from the random number in the Server Hello message, and (iv) the case in which the authenticator is verified based on the public key in the client certificate and a verification result indicates invalid. It is assumed that a verification result indicating the continuation of the agreement process is obtained.

To notify the result of the verification, the control unit 202 sends a Biometric Verify message $M_{BV}$ including, as illustrated in FIG. 14, Authentication Result indicating the verification result of the authentication context, Authenticate Info which stores information about the biometric authentication process, and Signature created for these items with the server's private key, to the client apparatus 100 through the communication unit 201.

(Step ST6)

In the client apparatus 100, the control unit 102 receives the Biometric Verify message $M_{BV}$ through the communication unit 101. Thereafter, when the server requests a client certificate, the control unit 102 sends a Client Certificate message including the client certificate in the key saving unit 104, to the server apparatus 200 through the communication unit 101.

(Step ST7)

In the client apparatus 100, to notify the server of a pre-master_secret, the control unit 102 sends a Client Key Exchange message to the server apparatus 200 through the communication unit 101.

(Step ST8)

In the client apparatus 100, when the client certificate is sent at step ST6, for verification of the client certificate the control unit 102 generates, by the encrypting unit 111, a digital signature for the messages created up to this time, based on the private key in the key saving unit 104. Thereafter, the control unit 102 sends a Client Verify message including the messages created up to this time and the digital signature, to the server apparatus 200 through the communication unit 101.

(Step ST9)

In the client apparatus 100, the control unit 102 sends a Change Cipher Spec message declaring that secret communication is performed by a cipher suite agreed by both parties, to the server apparatus 200 through the communication unit 101.

(Step ST10)

In the client apparatus 100, the control unit 102 sends a Finished message indicating that the exchange with the server is completed normally and data required to establish a session is prepared, to the server apparatus 200 through the communication unit 101.

(Step ST11)

In the server apparatus 200, the control unit 202 sends a Change Cipher Spec message declaring that secret communication is performed by the cipher suite agreed by both parties, to the client apparatus 100 through the communication unit 201.

(Step ST12)

In the server apparatus 200, the control unit 202 sends a Finished message indicating that the exchange with the client is completed normally and data required to establish a session is prepared, to the client apparatus 100 through the communication unit 201.

(Step ST13)

After the completion of step ST12, the client apparatus and the server apparatus can share a key that allows to perform secret communication, and in a session thereafter a secure session can be established between the client apparatus and the server apparatus.

As described above, according to the present embodiment, by a configuration in which biometric authentication is also performed during an agreement process including certificate authentication, a secure session based on entity authentication and biometric authentication can be established without generating any unnecessary paths associated with two handshakes.

In addition, in the present embodiment, even when biometric authentication fails, the number of processes that are wasted can be reduced as compared with conventionally. Additionally, conventionally, when biometric authentication fails after establishing a secure session with entity authentication, a TLS session needs to be discarded and thus all the processes up to the biometric authentication are wasted. That is, conventionally, a large number of processes, i.e., processes through which a secure session is established with entity authentication, are wasted. Hence, it is desirable to reduce the number of such processes that are wasted.

In addition, by a configuration in which a Biometric Process message $M_{BP}$ including an authentication context including an encrypted random number which is generated from a random number included in a message exchanged during an agreement process is sent to the server apparatus 200, an agreement process including certificate authentication and biometric authentication are organically combined together, and thus, occurrence of communication associated with the biometric authentication can be suppressed. Also, by biometric authentication, impersonation where an unauthorized user uses an authorized client apparatus can be prevented.

In addition, steps ST4, ST6, and ST8 are optional processes, and if, without performing the processes at these steps, in the process at step ST5 a temporary key is generated by the server and used, then a handshake can establish a secure session only from a result of biometric authentication by the client.

If the processes at steps ST4, ST6 and ST8 are performed, then a secure session is established according to a result of biometric authentication and a result of authentication by a client certificate.

Furthermore, if a server certificate is sent at step ST3, then a result secure session is established according also to a result of authentication by the server certificate.

By the present embodiment, a secure session can be established by any biometric authentication apparatus (the units 105 to 108) connected to the client apparatus 100, and the server apparatus 200 can make a determination according to a policy held thereby, e.g., the accuracy of the biometric authentication apparatus.

Additionally, for a technique to extend TLS, TLS Extension is known (see, for example, S. Blake-Wilson, M. Nystrom, D. Hopwood, J. Mikkelsen, T. Wright, "Transport Layer Security (TLS) Extension", <URL: http://www.ietf.org/rfc/rfc4366.txt>). The present inventors have considered, before conceiving the present embodiment, that a TLS handshake is extended using the TLS Extension and a secure session is established based on biometric authentication. However, with such an extension that simply adds a biometric authentication path to a conventional TLS handshake, it is uncertain how processes for various data, e.g., challenge data, negotiation, etc., which are required for a biometric authentication process, are performed during a handshake and thus a secure session cannot be established properly based on biometric authentication.

However, according to the present embodiment, since processes for information and negotiation which are required for a biometric authentication process are appropriately performed when a TLS handshake is extended, the TSL handshake can be extended appropriately by the TLS Extension.

Although, in the present embodiment, a biometric authentication apparatus (the units 105 to 108) is included in the client apparatus 100, a biometric authentication apparatus may be an external apparatus, and the template saving unit 106 may be provided externally to the client apparatus 100 and connected, like an IC card, for example. Any form can be employed as long as client matching can be performed.

Also, although biometric authentication is performed by extending a TLS handshake in the embodiment, the embodiment can also be similarly applied to SSL (Secure Socket Layer) or other handshakes that establish a secure session.

From the above, an apparatus that sends messages for establishing a secure session based on a result of biometric authentication can be configured, and creation of messages for establishing a secure session based on a result of biometric authentication can be implemented.

In addition, in the present embodiment, even if the order of "steps ST-CBN and ST-SBN", "steps ST-BP and ST-BV", and "steps ST6 to ST8" is changed, the same effects can be obtained by performing the steps in the same manner. However "steps ST-CBN and ST-SBN" need to be performed earlier than "steps ST-BP and ST-BV".

Specifically, in the present embodiment, "steps ST-CBN and ST-SBN", "steps ST6 to ST8", and "steps ST-BP and ST-BV" can also be performed in this order. Also, in the present embodiment, "steps ST6 to ST8", "steps ST-CBN and ST-SBN", and "steps ST-BP and ST-BV" can also be performed in this order.

Second Embodiment

FIG. 15 is a schematic diagram illustrating a configuration of an authentication system according to a second embodiment of the present invention, and substantially the same parts as those in FIG. 1 are denoted by the same reference numerals and detailed description thereof is omitted and differing parts are mainly described. In each of the following embodiments, too, likewise overlapping descriptions are omitted.

The second embodiment is a modification of the first embodiment and is an embodiment of server matching where a result of biometric authentication obtained on the side of a client apparatus 100a is subjected to biometric authentication on the side of a server apparatus 200a.

Accordingly, compared with the client apparatus 100 illustrated in FIG. 1, the client apparatus 100a is configured such that a template saving unit 106 and a biometric authentication performing unit 108 are eliminated and a control unit 102a and a biometric authentication process control unit 105a whose functions described above are changed are included.

The control unit 102a has the following functions (f102a-1) to (f102a-7).

(f102a-1) A random number generation function to generate a client random number (first random number).

(f102a-2) The function of creating a Client Hello message (first message) including the client random number and sending the Client Hello message to the server apparatus 200a through a communication unit 101 during an agreement process.

(f102a-3) The function of receiving, after sending the Client Hello message, a Server Hello message (second message) including a server random number (second random number) from the server apparatus 200a through the communication unit 101.

(f102a-4) The function of creating a Biometric Negotiation message including biometric authentication method information and sending the Biometric Negotiation message to the server apparatus 200a through the communication unit 101.

(f102a-5) The function of activating, after sending the Biometric Negotiation message, the biometric authentication process control unit 105a based on biometric authentication method information notified from the server apparatus 200a.

(f102a-6) The function of generating, by an encrypting unit 111, an encryption parameter by a hash algorithm, based on the client random number (first random number) and the server random number (second random number).

(f102a-7) The function of encrypting, by the encrypting unit 111, biometric information obtained by the biometric authentication process control unit 105a, based on the encryption parameter and notifying the server apparatus 200a of the resulting encrypted biometric information through the communication unit 101 and thereby continuing the agreement process.

The biometric authentication process control unit 105a has the function of obtaining, when activated by the control unit 102a, user's biometric information by a biometric information obtaining unit 107 and sending out the biometric information to the control unit 102a.

Likewise, compared with the server apparatus 200 illustrated in FIG. 1, the server apparatus 200a is configured such that a template saving unit 211 and a biometric authentication performing unit 212 are added and a control unit 202a whose functions described above are changed is included.

The control unit 202a has the following functions (f202a-1) to (f202a-10).

(f202a-1) The function of receiving, during an agreement process, a Client Hello message (first message) including random (a first random number; hereinafter, also referred to as a client random number) generated by the client apparatus 100a, from the client apparatus 100a through a communication unit 201.

(f202a-2) The function of sending, after receiving the Client Hello message, a Server Hello message (second message) including random (a second random number; hereinafter, also referred to as a server random number) generated by the server apparatus 200a, to the client apparatus 100a through the communication unit 201.

(f202a-3) The function of receiving a Biometric Negotiation message including biometric authentication method information indicating a biometric authentication method of the client apparatus 100a, from the client apparatus 100a through the communication unit 201.

(f202a-4) The function of determining whether the biometric authentication method information in the Biometric Negotiation message matches any of pieces of biometric authentication method information in a security policy saving unit 203.

(f202a-5) The function of notifying, when a result of the determination indicates a match, the client apparatus 100a of the biometric authentication method information through the communication unit 201.

(f202a-6) The function of receiving, after the notification, encrypted biometric information which is obtained by encrypting user's biometric information obtained according to the biometric authentication method information, based on the client random number (first random number) and the server random number (second random number), from the client apparatus 100a through the communication unit 201.

(f202a-7) The function of generating, by an encrypting unit 207, an encryption parameter by a hash algorithm, based on the client random number in the Client Hello message and the server random number in the Server Hello message.

(f202a-8) The function of decrypting, by the encrypting unit 207, the encrypted biometric information based on the encryption parameter.

(f202a-9) The function of sending out biometric information obtained as a result of the decryption to the biometric authentication performing unit 212.

(f202a-10) The function of discontinuing the agreement process when a result of biometric authentication received from the biometric authentication performing unit 212 indicates invalid.

The template saving unit 211 has the function of storing biometric information (templates) of users registered in advance and outputting the templates to the biometric authentication performing unit 212 in response to a request from the biometric authentication performing unit 212.

The biometric authentication performing unit 212 has the function of performing biometric authentication on biometric information received from the control unit 202a, based on the templates in the template saving unit 211 and sending out a result of the biometric authentication to the control unit 202a.

The operations of the authentication system configured in the above-described manner will be described below using a sequence diagram in FIG. 16. Each sequence diagram represents a handshake protocol for secret communication.

(Steps ST1 to ST8)

Steps ST1 to ST-SBN are the same as those in the first embodiment and thus description thereof is omitted. After step ST-SBN, the above-described steps ST6 to ST8 need to be performed.

(Step ST-BP)

In the client apparatus 100a, the control unit 102a receives, through the communication unit 101, a Server Biometric Negotiation message including biometric authentication method information which is notified from the server apparatus 200a. The control unit 102a activates the biometric authentication process control unit 105a based on the biometric authentication method information in the Server Biometric Negotiation message. The biometric authentication process control unit 105a controls the biometric information obtaining unit 107 to obtain user's biometric information and sends out the obtained biometric information to the control unit 102a.

When the control unit 102a obtains the biometric information, the control unit 102a generates, by the encrypting unit 111, an encryption parameter based on random in a Client Hello message and random in a Server Hello message and encrypts the biometric information using the encryption parameter and thereby obtains encrypted biometric information.

Thereafter, the control unit 102a sends a Biometric Process message $M_{BP}$ including the encrypted biometric information to the server apparatus 200a through the communication unit 101.

For a technique for encrypting biometric information, for example, a technique such as that shown below may be used.

The client apparatus 100a uses a specification for encrypting and compressing biometric information that is agreed by a Client Hello message $M_{CH}$ and a Server Hello message $M_{SH}$.

Also, the client 100a generates parameters such as a key to encrypt biometric information (if necessary, additionally, an initial vector), in the same manner as main parameters to be used in a normal state (e.g., client/server write MAC secrets, client/server write keys, client/server write initial vectors, etc.).

Namely, the client apparatus 100a generates an encryption parameter (encryption key) for biometric information using a server random number, a client random number, and a premaster secret which are included in messages known in the art and based on a hash algorithm. Specifically, the control unit 102a inputs a server random number, a client random number, and a premaster secret to a pseudo-random function (PRF) of the encrypting unit 111 and uses the resulting value as a master secret.

Then, a value obtained by inputting likewise the master secret, the server random, and the client random to the pseudo-random function PRF is used as a key block and the key block is divided into required sizes, whereby parameters are obtained. At this time, although in known secret communication protocols essentially an extra key block is discarded, an encryption parameter (a write key and a write initial vector) is generated as an extra key block. Thereafter, the encrypting unit 111 encrypts biometric information based on the encryption parameter and sends out the resulting encrypted biometric information to the control unit 102a.

The control unit 102a stores the encrypted biometric information in Extension Data of an Authentication Result and thereby composes a Biometric Process message $M_{BP}$ and sends the Biometric Process message $M_{BP}$ to the server apparatus 200a.

(Step ST-BV)

In the server apparatus 200a, the control unit 202a receives the Biometric Process message $M_{BP}$ through the communication unit 201.

The control unit 202a generates, as with the client, an encryption parameter from the random numbers by control of the encrypting unit 207 and decrypts the encrypted biometric information included in the Biometric Process message $M_{BP}$, based on the encryption parameter and thereby obtains biometric information.

The control unit 202a sends out the biometric information to the biometric information verifying unit 212. The biometric information verifying unit 212 performs server matching based on the biometric information and sends out a result of biometric authentication to the control unit 202a.

Thereafter, the control unit 202a sends a Biometric Verify message $M_{BV}$ including the result of biometric authentication to the client apparatus 100a through the communication unit 201

(Steps ST9 to ST13)

Steps ST9 to ST13 are the same as those in the first embodiment and thus description thereof is omitted.

As described above, according to the present embodiment, even when the configuration is modified to one in which server matching is performed, by a configuration in which biometric authentication is also performed during an agreement process including certificate authentication, a secure session based on entity authentication and biometric authentication can be established without generating any unnecessary paths associated with two handshakes. In addition, even when biometric authentication fails, the number of processes that are wasted can be reduced as compared with conventionally.

In addition, by a configuration in which biometric information is encrypted based on a client random number and a server random number which are included in Hello messages exchanged during an agreement process and the encrypted biometric information is sent to the server apparatus 200a, while an agreement process including certificate authentication and biometric authentication are organically combined together, biometric authentication by server matching can be implemented. Also, by biometric authentication, impersonation, in which an unauthorized user uses an authorized client apparatus, can be prevented.

In the case in which in the first embodiment a result of biometric information is encrypted and sent, encryption can be performed by execution using the same sequence as that in the present embodiment.

Although in the present embodiment the client apparatus 100a obtains biometric information and sends the biometric information to the server apparatus 200a and the server apparatus 200a performs a process of checking the biometric information against the templates held by the server apparatus 200a and thereby performs biometric authentication, an embodiment may be such that obtained biometric information and templates are sent from the client apparatus 100a and a check process is performed by the server apparatus 200a, and it can be said that there are such a number of combinations thereof that is equal to the number of combinations of embodiments of biometric authentication.

From the above, an apparatus that safely sends biometric information to the server apparatus 200a and sends messages for establishing a secure session based on a check result obtained by the server apparatus 200a can be configured and creation of messages for establishing a secure session based on a result of biometric authentication can be implemented.

Additionally, in either of the conventional TLS protocol and TLS Inner Application, when a client apparatus sends biometric information to a server apparatus and the server apparatus performs biometric authentication by matching and then establishes a secure session, since the biometric information is credential information, the biometric information needs to be encrypted and sent. However, when biometric authentication is simply performed during a conventional TLC handshake, since biometric information needs to be sent before establishing a secure session, there is no means for protecting the biometric information by encryption, etc. On the other hand, in the present embodiment, as described above, biometric information can be protected by being encrypted and sent.

In addition, in the present embodiment, even if the order of "steps ST-CBN and ST-SBN" and "steps ST6 to ST8" is changed, the same effects can be obtained by performing the steps in the same manner. However, "steps ST-BP and ST-BV" cannot be moved. The reason for this is that the paths of "steps ST6 to ST8" are required to encrypt data and "steps ST-CBN and ST-SBN" are required to negotiate biometric authentication.

Specifically, in the present embodiment, "steps ST6 to ST8", "steps ST-CBN and ST-SBN", and "steps ST-BP and ST-BV" can also be performed in this order.

Third Embodiment

Figure 17:
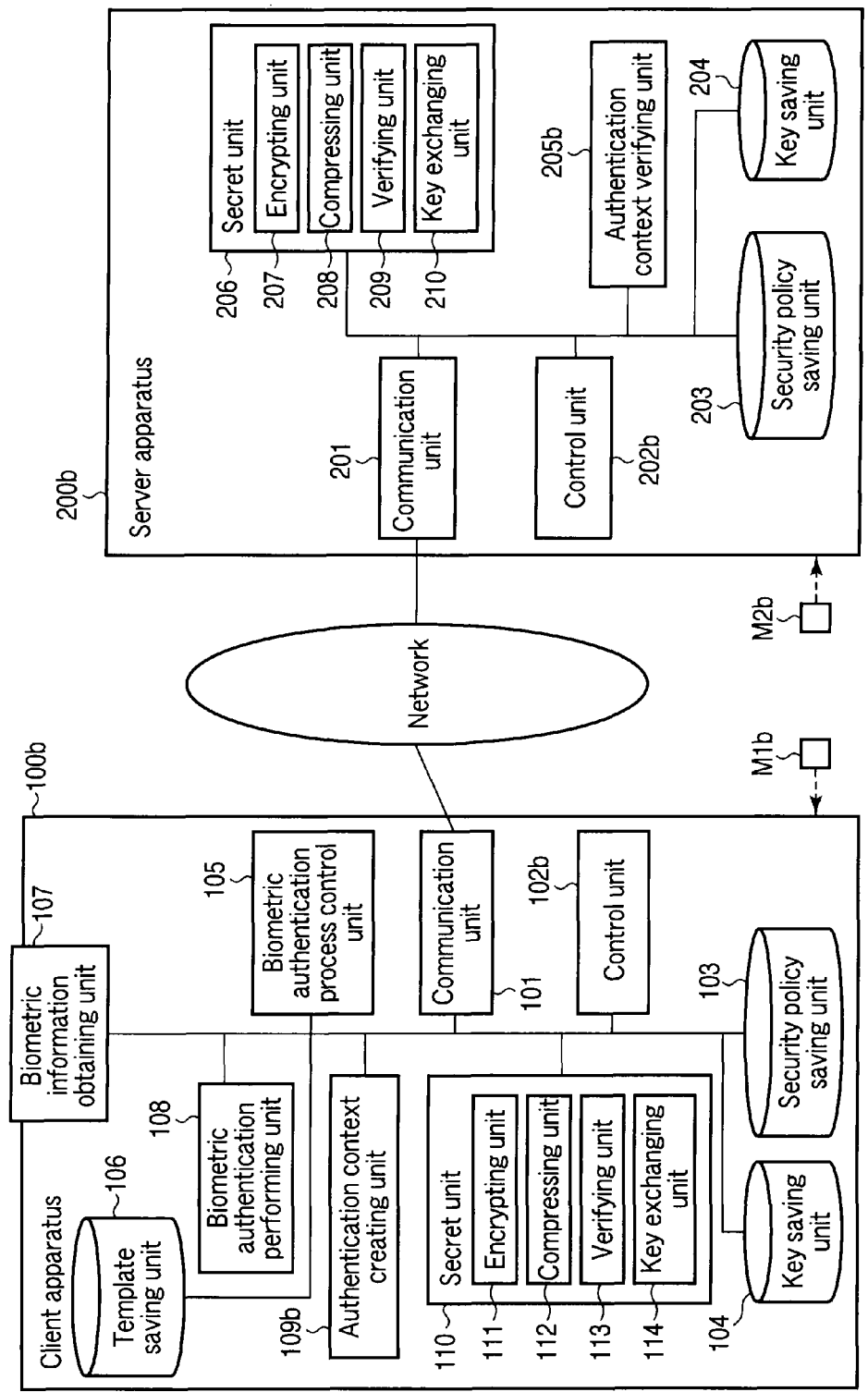
FIG. 17 is a schematic diagram illustrating a configuration of an authentication system according to a third embodiment of the present invention.

FIG. 17 is a schematic diagram illustrating a configuration of an authentication system according to a third embodiment of the present invention.

The third embodiment is a modification of the first embodiment and is an embodiment in which biometric authentication is performed on the side of a client apparatus 100b and a client certificate obtained based on a result of the biometric authentication is sent to a server apparatus 200b to perform client authentication.

Accordingly, compared with the client apparatus 100 illustrated in FIG. 1, the client apparatus 100b is configured such that a control unit 102b and an authentication context creating unit 109b whose functions are described above are changed are included.

The control unit 102b has the following functions (f102b-1) to (f102b-7).

(f102b-1) The function of sending, during an agreement process, a Client Hello message (first message) including the fact that a client certificate is to be obtained based on a result of user's biometric authentication, to the server apparatus 200b through a communication unit 101.

(f102b-2) The function of receiving, after sending the Client Hello message, a Server Hello message (second message) including a server random number from the server apparatus 200b through the communication unit 101.

(f102b-3) The function of activating a biometric authentication process control unit 105 after receiving the Server Hello message.

(f102b-4) The function of encrypting, by an encrypting unit 111, the server random number based on a private key in a key saving unit 104 and thereby generating an encrypted random number.

(f102b-5) The function of sending a client certificate in the key saving unit 104 to the server apparatus 100b through the communication unit 101 when a result of biometric authentication obtained by the biometric authentication process control unit 105 indicates valid.

(f102b-6) The function of sending out information guaranteeing the validity of the result of biometric authentication and a process thereof and the encrypted random number, to the authentication context creating unit 109b.

(f102b-7) The function of sending an authentication context received from the authentication context creating unit 109b, to the server apparatus 200b through the communication unit 101 and thereby continuing the agreement process.

The authentication context creating unit 109b has the following functions (f109b-1) to (f109b-3).

(f109b-1) The function of generating an authenticator from a result of biometric authentication and an encrypted random number which are received from the control unit 102b, based on the private key in the key saving unit 104.

(f109b-2) The function of creating an authentication context including the result of biometric authentication, the encrypted random number, and the authenticator.

(f109b-3) The function of sending out the created authentication context to the control unit 102b.

As an example of the authentication context, as illustrated in FIG. 18, a client certificate block pc in the aforementioned configuration in FIG. 3 may be omitted. A data block pd includes, for example, a result of biometric authentication and an encrypted random number, but unlike the aforementioned case, biometric authentication method information may be omitted. The reason that biometric authentication method information can be omitted is that, unlike the aforementioned case, there is no biometric negotiation step and any biometric authentication method can be used.

Likewise, compared with the server apparatus 200 illustrated in FIG. 1, the server apparatus 200b is configured such that a control unit 202b and an authentication context verifying unit 205b whose functions described above are changed are included.

The control unit 202b has the following functions (f202b-1) to (f202b-7).

(f202b-1) The function of receiving, during an agreement process, a Client Hello message (first message) including the fact that a client certificate is to be obtained based on a result of user's biometric authentication, from the client apparatus 100b through a communication unit 201.

(f202b-2) The function of sending, after receiving the Client Hello message, a Server Hello message (second message) including a server random number to the client apparatus 100b through the communication unit 201.

(f202b-3) The function of receiving, after sending the Server Hello message, a client certificate from the client apparatus 100b through the communication unit 201.

(f202b-4) The function of receiving, after sending the Server Hello message, an authentication context including a result of user's biometric authentication, an encrypted random number, and an authenticator from the client apparatus 100b through the communication unit 201.

(f202b-5) The function of writing the received client certificate and authentication context to a key saving unit 204.

(f202b-6) The function of activating the authentication context verifying unit 205b.

(f202b-7) The function of continuing or discontinuing the agreement process according to a verification result received from the authentication context verifying unit 205b.

The authentication context verifying unit 205b has the function of verifying, when activated by the control unit 202b, the authentication context in the key saving unit 204 and sending out to the control unit 202b a verification result indicating the discontinuation of the agreement process when any of the following (i) to (iii) applies; and the function of sending out to the control unit 202b a verification result indicating the continuation of the agreement process except for the cases of (i) to (iii).

(i) The case in which the result of biometric authentication in the authentication context which is stored in the key saving unit 204 indicates invalid. (ii) The case in which the encrypted random number in the authentication context which is stored in the key saving unit 204 is decrypted based on a public key in the client certificate and the resulting random number differs from the random number in the Server Hello message. (iii) The case in which the authenticator is verified based on the public key in the client certificate which is stored in the key saving unit 204 and a verification result indicates invalid.

Figure 19:
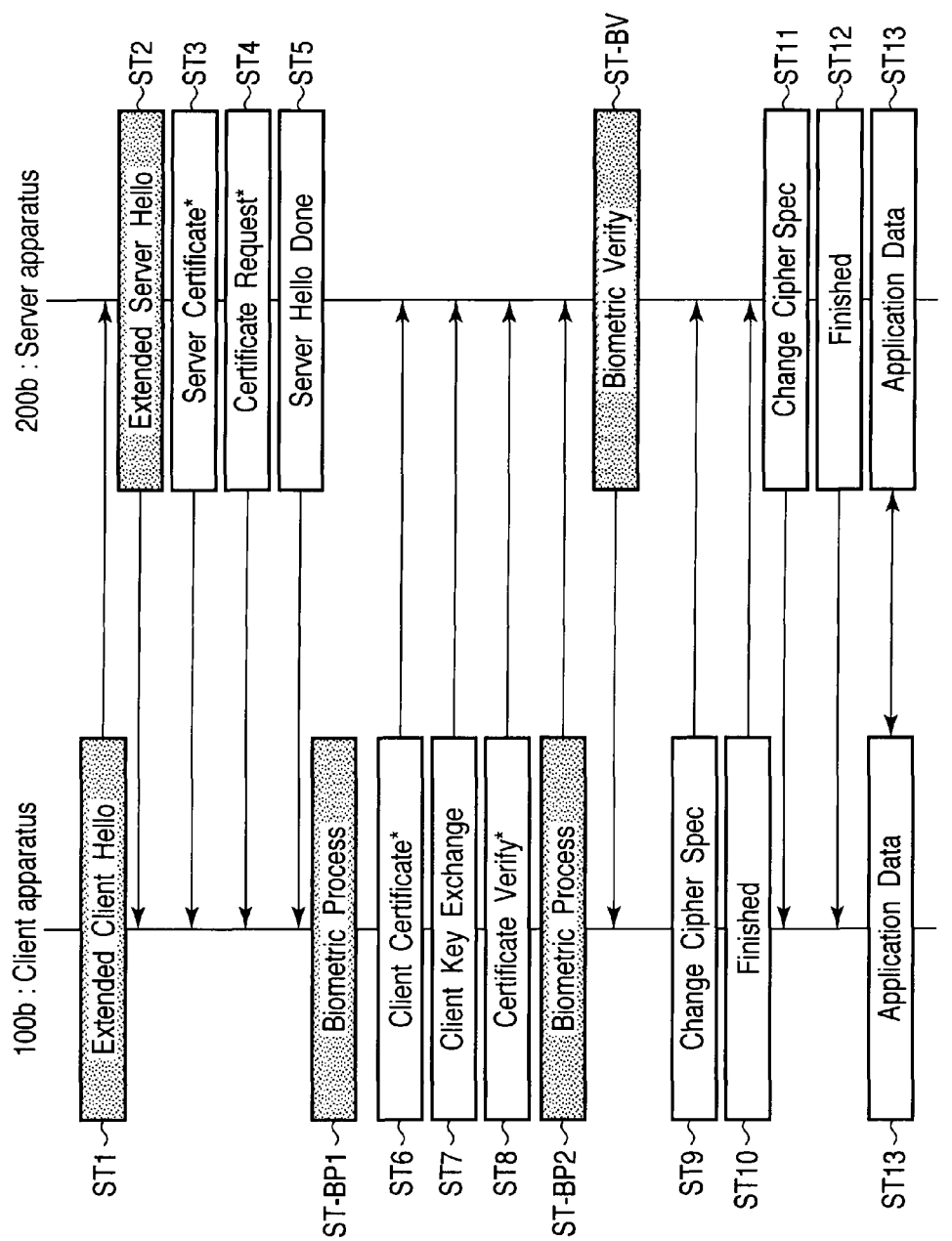
FIG. 19 is a sequence diagram for describing operations in the third embodiment.

The operations of the authentication system configured in the above-described manner will be described below using a sequence diagram in FIG. 19.

(Step ST1)

In the client apparatus 100b, to notify that there is a handshake extension process, the control unit 102b sends an extended Client Hello message $M_{CH}$ to the server apparatus 200b through the communication unit 101.

An Extension list of the Client Hello message $M_{CH}$ notifies the server apparatus 200b that a client certificate of the client apparatus 100b has been obtained based on a result of biometric authentication and that the result of biometric authentication is delivered.

(Step ST2)

In the server apparatus 200b, the control unit 202b receives the Client Hello message $M_{CH}$ through the communication unit 201. To notify the acceptance of the handshake extension process, the control unit 202b sends an extended Server Hello message $M_{SH}$ to the client apparatus 100b through the communication unit 201.

(Steps ST3 to ST5)

Steps ST3 to ST5 are the same as those in the first embodiment and thus description thereof is omitted.

(Step ST-BP1)

In the client apparatus 100b, when the control unit 102b receives a Server Hello Done message at step ST5 through the communication unit 101, the control unit 102b activates the biometric authentication process control unit 105. The biometric authentication process control unit 105 controls the units 106 to 108 to perform a user biometric authentication process and sends out an obtained result of biometric authentication to the control unit 102b.

When the result of biometric authentication indicates valid, the control unit 102b continues the agreement process and moves to step ST6. For a biometric authentication method used here, unlike the first embodiment, a biometric negotiation step with the server apparatus 200b is not performed and thus an arbitrary biometric authentication method is used.

(Step ST6)

In the client apparatus 100b, the control unit 102b sends a Client Certificate message including a client certificate in the key saving unit 104, to the server apparatus 200 through the communication unit 101.

(Steps ST7 and ST8)

Steps ST7 and ST8 are the same as those in the first embodiment and thus description thereof is omitted.

(Step ST-BP2)

The control unit 102b encrypts, by the encrypting unit 111, random number included in the Server Hello message $M_{SH}$, based on a private key in the key saving unit 104 and thereby generates an encrypted random number. The encrypted random number is sent out to the authentication context creating unit 109b from the control unit 102b. The control unit 102b also sends out the result of biometric authentication obtained at step ST6 to the authentication context creating unit 109b.

The authentication context creating unit 109b generates an authenticator from the result of biometric authentication and the encrypted random number, based on the private key in the key saving unit 104.

Thereafter, the authentication context creating unit 109b creates an authentication context including various information to guarantee the validity of the result of biometric authentication and the biometric authentication process, such as obtained biometric information (sample), biometric information (templates) referred to, and a certificate of the biometric information referred to (template certificate), the encrypted random number, and the authenticator, and sends out the authentication context to the control unit 102*b*.

The control unit 102*b* sends a Biometric Process message $M_{BP}$ including the authentication context to the server apparatus 200*b* through the communication unit 101. By this, the agreement process continues.

If there is a need to perform encryption, then by performing the same process as that in the second embodiment the authentication context can be encrypted and sent.

(Step ST-BV)

In the server apparatus 200*b*, when the control unit 202*b* receives the Biometric Process message $M_{BP}$ through the communication unit 201, the control unit 202*b* sends out the authentication context in the Biometric Process message $M_{BP}$ to the authentication context verifying unit 205*b*.

The authentication context verifying unit 205*b* verifies the authentication context and sends out a verification result to the control unit 202*b*. The control unit 202*b* continues or discontinues the agreement process according to the verification result of the authentication context. A verification result for the case of discontinuing the agreement process includes, for example, (i) the case in which the result of biometric authentication in the authentication context which is stored in the key saving unit 204 indicates invalid, (ii) the case in which the encrypted random number in the authentication context which is stored in the key saving unit 204 is decrypted based on a public key in the client certificate and the resulting random number differs from the random number in the Server Hello message, and (iii) the case in which the authenticator is verified based on the public key in the client certificate which is stored in the key saving unit 204 and a verification result indicates invalid. It is assumed that a verification result indicating the continuation of the agreement process is obtained.

To notify the result of the verification, the control unit 202*b* sends a Biometric Verify message $M_{BV}$ including Authentication Result indicating the verification result of the authentication context, Authenticate Info which contains information about the biometric authentication process, and Signature created for these items with a server's private key, to the client apparatus 100*b* through the communication unit 201.

(Steps ST9 to ST13)

Steps ST9 to ST13 are the same as those in the first embodiment and thus description thereof is omitted.

As described above, according to the present embodiment, even when the configuration is modified to one in which a client certificate is obtained based on biometric authentication and sent to the server apparatus 200*b*, as with the aforementioned case, by a configuration in which biometric authentication is also performed during an agreement process including certificate authentication, a secure session based on entity authentication and biometric authentication can be established without generating any unnecessary paths associated with two handshakes. In addition, even when biometric authentication fails, the number of those processes that are wasted can be reduced over conventional cases.

Also, by a configuration in which a client message including the fact that a client certificate is to be obtained based on a result of user's biometric authentication is sent to the server apparatus 200*b*, the server apparatus 200*b* can verify that a secure session is established using a client certificate obtained based on biometric authentication. Also, by biometric authentication, impersonation, in which an unauthorized user uses an authorized client apparatus, can be prevented.

From the above, an apparatus that sends messages for establishing a secure session using a certificate obtained based on a result of biometric authentication can be configured, and creation of messages for establishing a secure session using a certificate obtained based on a result of biometric authentication can be implemented.

Additionally, in either of the conventional TLS protocol and TLS Inner Application, in the case in which, when entity authentication is performed based on a certificate held by an entity apparatus and then a secure session is established, the certificate of the entity apparatus is obtained based on a result of biometric authentication, there is no means for notifying a server of such a fact in TLS handshake. On the other hand, in the present embodiment, as described above, the fact that a certificate of an entity apparatus (client apparatus 100*b*) is obtained based on a result of biometric authentication can be notified to the server apparatus 200*b*.

In addition, in the present embodiment, even if the order of "steps ST6 to ST8" and "steps ST-BP and ST-BV" is changed and "steps ST-BP and ST-BV" and "steps ST6 to ST8" are performed in this order, the same effects can be obtained.

Fourth Embodiment

FIG. 20 is a schematic diagram illustrating a configuration of an authentication system according to a fourth embodiment of the present invention.

The fourth embodiment is a modification of the first embodiment and is an embodiment in which a time stamp is created in advance in an authentication context, before an agreement process. A time stamp may be created using, for example, a time stamp service which complies with RFC 3161 (see, for example, C. Adams, P. Cain, D. Pinkas, R. Zuccherato, "Internet X.509 Public Key Infrastructure Time-Stamp Protocol (TSP)", <URL: http://www.ietf.org/rfc/rfc3161.txt>).

Accordingly, compared with the client apparatus 100 illustrated in FIG. 1, a client apparatus 100*c* is configured such that a time stamp assigning unit 115 is added and a control unit 102*c* and an authentication context creating unit 109*c* whose functions described above are changed are included.

The control unit 102*c* has the following functions (102*c*-1) to (102*c*-6).

(102*c*-1) The function of activating a biometric authentication process control unit 105 before an agreement process.

(102*c*-2) The function of sending out a result of biometric authentication received from the biometric authentication process control unit 105, to the authentication context creating unit 109*c*.

(102*c*-3) The function of sending out an authentication context received from the authentication context creating unit 109*c*, to the time stamp assigning unit 115.

(102*c*-4) The function of receiving an authentication context assigned a time stamp from the time stamp assigning unit 115.

(102*c*-5) The function of creating a Biometric Negotiation message including biometric authentication method information and sending the Biometric Negotiation message to a server apparatus 200*c* through a communication unit 101 during the agreement process.

(102*c*-6) The function of sending, after sending the Biometric Negotiation message, the above-described authentication context assigned a time stamp to the server apparatus 200*c* through the communication unit 101, based on biometric authentication method information notified from the server apparatus 200*c*, and thereby continuing the agreement process.

The authentication context creating unit 109*c* has the following functions (109*c*-1) to (102*c*-3).

(109c-1) The function of generating, when receiving a result of biometric authentication from the control unit 102c, an authenticator from the result of biometric authentication, biometric authentication method information in a security policy saving unit 103, and a client certificate in a key saving unit 104, based on a client's private key.

(109c-2) The function of creating, before an agreement process, an authentication context including information guaranteeing the validity of the result of biometric authentication and a process thereof, the biometric authentication method information, the client certificate, and the authenticator.

(109c-3) The function of sending out the authentication context to the control unit 102c.

The time stamp assigning unit 115 has the following functions (f115-1) to (f115-3).

(f115-1) The function of sending, when receiving an authentication context from the control unit 102c, the authentication context to a time stamp providing apparatus 300 through the communication unit 101 before an agreement process.

(f115-2) The function of receiving an authentication context assigned a time stamp by assigning a time stamp generated based on a time stamp private key of the time stamp providing apparatus 300 to the sent authentication context and date and time information in the time stamp providing apparatus 300, from the time stamp providing apparatus 300 through the communication unit 101.

(f115-3) The function of sending out the authentication context assigned a time stamp to the control unit 102c.

As a method of assigning a time stamp, any method can be used, but a method is used in which a time stamp is assigned by requesting the external time stamp providing apparatus 300.

The time stamp providing apparatus 300 holds a time stamp public key and a time stamp private key in a storage apparatus (not shown) and has the following functions (f300-1) to (f300-3).

(f300-1) The function of generating, when receiving an authentication context from the client apparatus 100c, a time stamp (digital signature) for information in which current date and time information is added to the authentication context, based on the time stamp private key.

(f300-2) The function of sending back the authentication context assigned the time stamp to the client apparatus 100c.

(f300-3) The function of sending, when receiving a request from the server apparatus 200c, the time stamp public key to the server apparatus 200c.

Meanwhile, compared with the server apparatus 200 illustrated in FIG. 1, the server apparatus 200c is configured such that a time stamp verifying unit 213 is added and a control unit 202c and an authentication context verifying unit 205c whose functions described above are changed are included.

The control unit 202c has the following functions (f202c-1) to (f202c-6).

(f202c-1) The function of receiving, during an agreement process, a Biometric Negotiation message including biometric authentication method information which indicates a biometric authentication method of the client apparatus 100c, from the client apparatus 100c through a communication unit 201.

(f202c-2) The function of determining whether the biometric authentication method information in the Biometric Negotiation message matches any of pieces of biometric authentication method information in a security policy saving unit 203.

(f202c-3) The function of notifying, when a result of the determination indicates a match, the biometric authentication method information to the client apparatus 100c through the communication unit 201.

(f202c-4) The function of receiving, after the notification, an authentication context which is assigned a time stamp using the private key of the time stamp providing apparatus 300 and which includes a result of user's biometric authentication, biometric authentication method information, a client certificate, and an authenticator, from the client apparatus 100c through the communication unit 201.

(f202c-5) The function of sending out the time stamp included in the authentication context assigned the time stamp to the time stamp verifying unit 213 and sending out the authentication context to the authentication context verifying unit 205c.

(f202c-6) The function of continuing or discontinuing the agreement process based on verification results received from the verifying units 213 and 205c.

The authentication context verifying unit 205c has the function of verifying the authentication context received from the control unit 202c and sending out to the control unit 202c a verification result indicating the discontinuation of the agreement process when any one of the following (i) to (iii) applies; and the function of sending out to the control unit 202c a verification result indicating the continuation of the agreement process except for the cases (i) to (iii).

(i) The case in which the result of biometric authentication in the authentication context indicates invalid. (ii) The case in which the biometric authentication method information in the authentication context differs from the notified biometric authentication method. (iii) The case in which the authenticator is verified based on a public key in the client certificate and a verification result indicates invalid.

The time stamp verifying unit 213 holds in advance a time stamp public key associated with the time stamp private key of the time stamp providing apparatus 300, in a storage apparatus (not shown). The time stamp verifying unit 213 has the following functions (f213-1) to (f213-3).

(f213-1) The function of decrypting, when receiving a time stamp from the control unit 202c, the time stamp based on the time stamp public key.

(f213-2) The function of sending out to the control unit 202c a verification result indicating the discontinuation of the agreement process when a difference between time and date information which is obtained as a result of the decryption and current date and time information is greater than a predetermined value.

(f213-3) The function of sending out to the control unit 202c a verification result indicating the continuation of the agreement process when the difference is equal to or less than the predetermined value.

A method of verifying a time stamp is not limited to a method in which the public key of the time stamp providing apparatus 300 is obtained and the time stamp verifying unit 213 performs verification, and any verification method which is associated with a method of assigning a time stamp can be used, such as requesting the time stamp providing apparatus 300 to perform verification.

(Entire Sequence)

The operations of the authentication system configured in the above-described manner will be described below using a sequence diagram in FIG. 21.

(Step ST0)

The client apparatus 100c performs, in advance, user's biometric authentication, creates an authentication context including a result of the biometric authentication, and assigns a time stamp to the authentication context using an existing technique.

Specifically, for example, in the client apparatus 100c, the control unit 102c activates the biometric authentication process control unit 105 before an agreement process. The biometric authentication process control unit 105 controls units 106 to 108 to perform a user biometric authentication process and sends out an obtained result of biometric authentication to the control unit 102c.

The control unit 102c sends out the result of biometric authentication to the authentication context creating unit 109c.

The authentication context creating unit 109c generates an authenticator from the result of biometric authentication, biometric authentication method information in the security policy saving unit 103, and a client certificate in the key saving unit 104, based on a client's private key.

Thereafter, the authentication context creating unit 109c creates an authentication context including various information to guarantee the validity of the result of biometric authentication and the biometric authentication process, such as obtained biometric information (sample), biometric information (templates) referred to, and a certificate of the biometric information referred to (template certificate), the biometric authentication method information, the client certificate, and the authenticator, and sends out the authentication context to the control unit 102c.

The control unit 102c sends out the authentication context to the time stamp assigning unit 115.

The time stamp assigning unit 115 sends the authentication context to the time stamp providing apparatus 300 through the communication unit 101.

The time stamp providing apparatus 300 generates a time stamp for information in which date and time information is added to the authentication context, based on the time stamp private key of the time stamp providing apparatus 300, and assigns the time stamp to the authentication context.

Also, the time stamp providing apparatus 300 sends the authentication context assigned the time stamp to the client apparatus 100c.

In the client apparatus 100c, when the time stamp assigning unit 115 receives the authentication context assigned the time stamp through the communication unit 101, the time stamp assigning unit 115 sends out the authentication context assigned the time stamp to the control unit 102c.

The control unit 102c saves the authentication context assigned the time stamp in a storage apparatus (not shown).

(Step ST1)

In the client apparatus 100c, to notify that there is a handshake extension process, the control unit 102c sends an extended Client Hello message $M_{CH}$ through the communication unit 101.

An Extension list of the Client Hello message $M_{BH}$ notifies that client authentication is performed using an authentication context assigned a time stamp.

(Step ST2)

In the server apparatus 200c, the control unit 202c receives the Client Hello message $M_{CH}$ through the communication unit 201. To notify the acceptance of the handshake extension process, the control unit 202c sends an extended Server Hello message $M_{SH}$ to the client apparatus 100c through the communication unit 201.

(Steps ST3 to ST5)

Steps ST3 to ST5 are the same as those in the first embodiment and thus description thereof is omitted.

(Step ST-CBN)

In the client apparatus 100c, to notify the server of a biometric authentication method for the biometric authentication which has been performed in advance by the client apparatus 100c, the control unit 102 sends, through the communication unit 101, a Client Biometric Negotiation message $M_{CBN}$ including biometric authentication method information.

The Client Biometric Negotiation message $M_{CBN}$ includes, as illustrated in FIG. 11, a Biometric Method List in which biometric authentication method information is listed.

(Step ST-SBN)

In the server apparatus 200c, when the control unit 202c receives the Client Biometric Negotiation message through the communication unit 201, the control unit 202c determines whether the biometric authentication method information in the Biometric Method List in the Client Biometric Negotiation message matches any of the pieces of biometric authentication method information in the security policy saving unit 203.

When a result of the determination indicates a match, the control unit 202c sends a Server Biometric Negotiation message $M_{SBN}$ including the biometric authentication method information to the client apparatus 100c through the communication unit 201. There may be a plurality of selected methods.

If the biometric authentication method performed in advance does not satisfy server's policies, then Alert in TLS handshake, which is a known technology, is returned to terminate the handshake process.

(Step ST-BP)

In the client apparatus 100c, when the control unit 102 receives the Server Biometric Negotiation message through the communication unit 101, the control unit 102 sends a Biometric Process message $M_{BP}$ including a relevant authentication context, based on the biometric authentication method information in the Server Biometric Negotiation message, to the server apparatus 200 through the communication unit 101.

The Biometric Process message $M_{BP}$ includes, as illustrated in FIG. 13, Authentication Result. The Authentication Result includes the authentication context assigned the time stamp which is created in advance.

(Step ST-BV)

In the server apparatus 200c, when the control unit 202c receives the Biometric Process message $M_{BP}$ through the communication unit 201, the control unit 202c sends out the time stamp included in the authentication context assigned the time stamp in the Biometric Process message $M_{BP}$ to the time stamp verifying unit 213 and sends out the authentication context to the authentication context verifying unit 205c.

The time stamp verifying unit 213 verifies the time stamp and sends out a verification result to the control unit 202c. The authentication context verifying unit 205c verifies the authentication context and sends out a verification result to the control unit 202c.

The control unit 202c continues or discontinues the agreement process based on the verification results received from the verifying units 213 and 205c. A verification result for the case of discontinuing the agreement process includes, for example, (i) the case in which the result of biometric authentication in the authentication context indicates invalid, (ii) the case in which the biometric authentication method information in the authentication context differs from the notified biometric authentication method, (iii) the case in which the authenticator is verified based on the public key in the client certificate and a verification result indicates invalid, and (iv) the case in which a difference between time and date information which is obtained by decrypting the time stamp and current date and time information is greater than a predetermined value. Here it is assumed that a verification result indicating the continuation of the agreement process is obtained.

To notify the result of the verification, the control unit 202c sends a Biometric Verify message $M_{BV}$ including, as illustrated in FIG. 14, Authentication Result of the authentication context assigned the time stamp, Authenticate Info which stores information about the biometric authentication process, and Signature created for these items with a server's private key.

(Steps ST6 to ST13)

Steps ST6 to ST13 perform the same operations as those in the first embodiment and thus description thereof is omitted.

As described above, according to the present embodiment, even when the configuration is modified to one in which biometric authentication is performed in advance and a time stamp is assigned to a created authentication context, as with the aforementioned case, by a configuration in which biometric authentication is also performed during an agreement process including certificate authentication, a secure session based on entity authentication and biometric authentication can be established without generating any unnecessary paths associated with two handshakes. In addition, even when biometric authentication fails, the number of processes that are wasted can be reduced as compared with conventionally.

In addition, by a configuration in which an authentication context assigned a time stamp is created before an agreement process, and during the agreement process the authentication context assigned a time stamp is sent to the server apparatus 200c, a secure session can be established based on an authentication context which is created in advance, without discontinuing an agreement process. In addition, by a time stamp assigned to an authentication context, replay attacks can be prevented.

In addition, an apparatus that sends messages for establishing a secure session based on an authentication context which is created in advance can be configured, and creation of messages for establishing a secure session based on an authentication context which is created in advance can be implemented.

Furthermore, a secure session can be established between the client apparatus 100c and the server apparatus 200c, using an authentication context which is created in advance, without discontinuing a handshake process.

Additionally, when biometric authentication is performed in the conventional TLS protocol, in the sense of preventing replay attacks, etc., biometric authentication needs to be performed using a challenge obtained in the protocol.

Therefore, in the conventional TLS protocol, there is a need to temporarily discontinue a process to obtain user's biometric information to perform, for example, a check process. Hence, in the conventional TLS protocol, when a secure session is established based on biometric authentication, a process cannot be performed as a series of operations between a client apparatus and a server apparatus, resulting in the discontinuation of a handshake.

On the other hand, in the present embodiment, as described above, without discontinuing a handshake process, a secure session can be established using an authentication context which is created in advance.

In addition, in the present embodiment, even if the order of "steps ST-CBN and ST-SBN", "steps ST-BP and ST-BV", and "steps ST6 to ST8" is changed, the same effects can be obtained by performing the steps in the same manner. However, "steps ST-CBN and ST-SBN" need to be performed earlier than "steps ST-BP and ST-BV".

Specifically, in the present embodiment, "steps ST-CBN and ST-SBN", "steps ST6 to ST8", and "steps ST-BP and ST-BV" can also be performed in this order. Also, in the present embodiment, "steps ST6 to ST8", "steps ST-CBN and ST-SBN", and "steps ST-BP and ST-BV" can also be performed in this order.

The method exhibited in each above-mentioned embodiment can be distributed as a computer executable program by storing into a storage medium such as a magnetic disk (Floppy™ disk, hard disk, etc.), an optical disk (CD-ROM, DVD, etc.), a magnet-optical disk (MO) and a semiconductor memory.

Regardless of type of storage format, any storage medium capable of storing the program and being read by the computer is usable as the storage medium for this program.

An operating system (OS) or middleware (MW) such as a database management software and a network software running on the computer, based on the instruction installed in the computer from the storage medium, may executes a part of each processing to achieve each above-described embodiment.

The storage medium for the invention is not limited to a medium independent from the computer, and includes the storage medium with a program transmitted via a LAN, the Internet, etc., downloaded and stored or temporarily stored thereon.

The number of the storage medium for the invention is not limited only one, and the storage medium of the invention includes the case that processing in each embodiment is respectively executed by means of a plurality of media, and any structure of the medium is acceptable.

The computer in the invention executes each processing in each above mentioned embodiment, based on the program stored in the storage medium. Any configuration of the computer such as a device composed of a single personal computer, etc., and a system composed of a plurality of devices network-connected therein are available.

The computer in the invention is not limited to a personal computer, and includes computing processing device, a micro-computer, etc., included in information processing equipment and generically means equipment and a device capable of achieving the functions of the invention.

The invention in its broader aspects is not limited to the specific details and representative embodiments shown and described herein, and can be embodied in their implementation phases by modifying constituent components without departing from the spirit or scope of the general inventive concept of the invention. A variety of modifications of the invention may be made by appropriate combinations of a plurality of constituent components shown in each foregoing embodiment. For example, some constituent components may be omitted from the whole of the constituent components shown in each embodiment. Furthermore, the constituent components over different embodiments can be appropriately combined.

As described above, according to the present invention, by a configuration in which biometric authentication is also performed during an agreement process including certificate authentication, a secure session based on entity authentication and biometric authentication can be established without generating any unnecessary paths associated with two handshakes. In addition, even when biometric authentication fails, the number of processes that are wasted can be reduced compared with conventionally.

What is claimed is:

1. A client apparatus, comprising:
a certificate storage device which stores a client certificate including a public key;
a private key storage device which stores a private key associated with the public key; and
a biometric authentication method storage device which stores biometric authentication method information indicating a biometric authentication method of a biometric authentication device, the biometric authentication device configured to perform biometric authentication on a user;
a computer connected to the storage devices and configured to comprise:
a device configured to perform, before secret communication is performed by an operation by the user with a server apparatus over a network, an agreement process including mutual certificate authentication with the server apparatus, and when a result of the certificate authentication indicates valid, a session for performing the secret communication can be established;
a device configured to receive a message including a random number from the server apparatus during the agreement process;
a device configured to create, after receiving the message, a biometric negotiation message including the biometric authentication method information and send the biometric negotiation message to the server apparatus;
a device configured to activate, after sending the biometric negotiation message, the biometric authentication device based on biometric authentication method information notified from the server apparatus;
a device configured to encrypt the random number based on the private key and thereby generate an encrypted random number;
a device configured to generate an authenticator from information guaranteeing validity of a result of the biometric authentication by the biometric authentication device and a process thereof, the biometric authentication method information, the encrypted random number, and the client certificate, based on the private key; and
a device configured to send to the server apparatus an authentication context including the information guaranteeing validity of a result of the biometric authentication and a process thereof, the biometric authentication method information, the encrypted random number, the client certificate, and the authenticator and thereby continue the agreement process.

2. A server apparatus, comprising:
a biometric authentication method storage device which stores a plurality of pieces of biometric authentication method information indicating biometric authentication methods for a user which can be accepted; and
a computer configured to comprise:
a device configured to perform, before secret communication is performed over a network with a client apparatus which is operated by the user, an agreement process including mutual certificate authentication with the client apparatus, and when a result of the certificate authentication indicates valid, a session for performing the secret communication can be established;
a device configured to send a message including a random number to the client apparatus during the agreement process;
a device configured to receive, after sending the message, a biometric negotiation message including biometric authentication method information which indicates a biometric authentication method of the client apparatus, from the client apparatus;
a device configured to determine whether the biometric authentication method information in the biometric negotiation message matches any of said plurality of pieces of biometric authentication method information in the biometric authentication method storage device;
a device configured to notify, when a result of the determination indicates a match, the client apparatus of the biometric authentication method information;
a device configured to receive, after the notification, an authentication context including information guaranteeing validity of a result of biometric authentication based on the biometric authentication method information and a process thereof, the biometric authentication method information, an encrypted random number, a client certificate, and an authenticator, from the client apparatus;
a device configured to discontinue the agreement process when the result of biometric authentication in the authentication context indicates invalid;
a device configured to discontinue the agreement process when the biometric authentication method information in the authentication context and the notified biometric authentication method information differ from each other;
a device configured to discontinue the agreement process when the encrypted random number in the authentication context is decrypted based on a public key in the client certificate and a resulting random number differs from the random number in the message; and
a device configured to discontinue the agreement process when the authenticator is verified based on the public key in the client certificate and a verification result indicates invalid.

3. A client apparatus comprising:
a biometric authentication method storage device which stores biometric authentication method information indicating a biometric authentication method of a biometric information obtaining device, the biometric information obtaining device obtaining biometric information from a user during an agreement process; and
a computer configured to comprise:
a device configured to perform, before secret communication is performed by an operation by the user with a server apparatus over a network, an agreement process including mutual certificate authentication with the server apparatus, and when a result of the certificate authentication indicates valid, a session for performing the secret communication can be established;
a random number generation device to generate a first random number;
a device configured to create a first message including the first random number and send the first message to the server apparatus during the agreement process;
a device configured to receive, after sending the first message, a second message including a second random number from the server apparatus;
a device configured to create a biometric negotiation message including the biometric authentication method information and send the biometric negotiation message to the server apparatus;
a device configured to activate, after sending the biometric negotiation message, the biometric information obtaining device based on biometric authentication method information notified from the server apparatus;

a device configured to generate an encryption parameter by a hash algorithm, based on the first random number and the second random number; and a device configured to encrypt the biometric information obtained by the biometric information obtaining device, based on the encryption parameter and notify the server apparatus of resulting encrypted biometric information and thereby continue the agreement process.

4. A server apparatus, comprising:

a biometric authentication method storage device which stores a plurality of pieces of biometric authentication method information indicating biometric authentication methods for a user which can be accepted;

a biometric reference information storage device which stores biometric reference information of the user; and a computer configured to comprise:

a device configured to perform, before secret communication is performed over a network with a client apparatus which is operated by the user, an agreement process including mutual certificate authentication with the client apparatus, and when a result of the certificate authentication indicates valid, a session for performing the secret communication can be established;

a device configured to receive a first message including a first random number from the client apparatus during the agreement process;

a device configured to send, after receiving the first message, a second message including a second random number to the client apparatus;

a device configured to receive from the client apparatus a biometric negotiation message including biometric authentication method information indicating a biometric authentication method of the client apparatus;

a device configured to determine whether the biometric authentication method information in the biometric negotiation message matches any of said plurality of pieces of biometric authentication method information in the biometric authentication method storage device;

a device configured to notify, when a result of the determination indicates a match, the client apparatus of the biometric authentication method information;

a device configured to receive, after the notification, encrypted biometric information from the client apparatus, the encrypted biometric information being obtained by encrypting biometric information of the user which is obtained according to the biometric authentication method information, based on the first random number and the second random number;

a device configured to generate an encryption parameter by a hash algorithm, based on the first random number in the first message and the second random number in the second message;

a device configured to decrypt the encrypted biometric information based on the encryption parameter;

a biometric authentication device which performs biometric authentication on biometric information which is obtained as a result of the decryption, based on the biometric reference information in the biometric reference information storage device; and a device configured to discontinue the agreement process when a result of the biometric authentication indicates invalid.

5. A client apparatus, comprising:

a biometric authentication device to perform biometric authentication on a user;

a certificate storage device which stores a client certificate including a public key;

a private key storage device which stores a private key associated with the public key; and a computer configured to comprise:

a device configured to perform, before secret communication is performed by an operation by the user with a server apparatus over a network, an agreement process including mutual certificate authentication with the server apparatus, and when a result of the certificate authentication indicates valid, a session for performing the secret communication can be established;

a device configured to send, during the agreement process, a first message including a fact that the client certificate is to be obtained based on a result of the biometric authentication of the user, to the server apparatus;

a device configured to receive, after sending the first message, a second message including a random number from the server apparatus;

a device configured to activate the biometric authentication device after receiving the second message;

a device configured to encrypt the random number based on the private key and thereby generate an encrypted random number;

a device configured to send the client certificate in the certificate storage device to the server apparatus when a result of the biometric authentication by the biometric authentication device indicates valid;

a device configured to generate an authenticator from information guaranteeing validity of the result of the biometric authentication and a process thereof and the encrypted random number, based on the private key; and a device configured to send to the server apparatus an authentication context including the information guaranteeing validity of the result of the biometric authentication and a process thereof, the encrypted random number, and the authenticator and thereby continue the agreement process.

6. A server apparatus, comprising:

a computer configured to comprise:

a device to perform, before secret communication is performed over a network with a client apparatus which is operated by a user, an agreement process including mutual certificate authentication with the client apparatus, and when a result of the certificate authentication indicates valid, a session for performing the secret communication can be established;

a device configured to receive, during the agreement process, a first message including a fact that a client certificate is to be obtained based on a result of biometric authentication of the user, from the client apparatus;

a device configured to send, after receiving the first message, a second message including a random number to the client apparatus;

a device configured to receive, after sending the second message, a client certificate from the client apparatus;

a device configured to receive, after sending the second message, an authentication context including information guaranteeing validity of a result of biometric authentication of the user and a process thereof, an encrypted random number, and an authenticator, from the client apparatus;

a storage device which stores the received client certificate and authentication context;

a device configured to discontinue the agreement process when the result of biometric authentication in the authentication context stored in the storage device indicates invalid;

a device configured to discontinue the agreement process when the encrypted random number in the authentication context stored in the storage device is decrypted based on a public key in the client certificate and a resulting random number differs from the random number in the second message; and a device configured to discontinue the agreement process when the authenticator is verified based on the public key in the client certificate stored in the storage device and a verification result indicates invalid.

7. A client apparatus, comprising:

a certificate storage device which stores a client certificate including a public key;

a private key storage device which stores a private key associated with the public key; and a computer configured to comprise:

a device configured to perform, before secret communication is performed by an operation by a user with a server apparatus over a network, an agreement process including mutual certificate authentication with the server apparatus, and when a result of the certificate authentication indicates valid, a session for performing the secret communication can be established;

a biometric authentication device to perform biometric authentication on the user before the agreement process;

a biometric authentication method storage device which stores biometric authentication method information indicating a biometric authentication method of the biometric authentication device;

a device configured to generate an authenticator from information guaranteeing validity of a result of the biometric authentication and a process thereof, the biometric authentication method information, and the client certificate, based on the private key;

a device configured to create, before the agreement process, an authentication context including the information guaranteeing validity of a result of the biometric authentication and a process thereof, the biometric authentication method information, the client certificate, and the authenticator;

a device configured to send, before the agreement process, the authentication context to a time stamp providing apparatus;

a device configured to receive from the time stamp providing apparatus an authentication context assigned a time stamp by assigning the time stamp to the sent authentication context and date and time information in the time stamp providing apparatus, the time stamp being generated based on a private key of the time stamp providing apparatus;

a device configured to create, during the agreement process, a biometric negotiation message including the biometric authentication method information and send the biometric negotiation message to the server apparatus; and a device configured to send, after sending the biometric negotiation message, the authentication context assigned a time stamp to the server apparatus based on biometric authentication method information notified from the server apparatus and thereby continue the agreement process.

8. A server apparatus, comprising:

a biometric authentication method storage device which stores a plurality of pieces of biometric authentication method information indicating biometric authentication methods for a user which can be accepted; and a computer configured to comprise:

a device configured to perform, before secret communication is performed over a network with a client apparatus which is operated by the user, an agreement process including mutual certificate authentication with the client apparatus, and when a result of the certificate authentication indicates valid, a session for performing the secret communication can be established;

a device configured to receive, during the agreement process, a biometric negotiation message including biometric authentication method information indicating a biometric authentication method of the client apparatus, from the client apparatus;

a device configured to determine whether the biometric authentication method information in the biometric negotiation message matches any of said plurality of pieces of biometric authentication method information in the biometric authentication method storage device;

a device configured to notify, when a result of the determination indicates a match, the client apparatus of the biometric authentication method information;

a device configured to receive, after the notification, an authentication context which is assigned a time stamp based on a private key of a time stamp providing apparatus and which includes a result of biometric authentication of the user, biometric authentication method information, a client certificate, and an authenticator, from the client apparatus;

a device configured to discontinue the agreement process when the result of biometric authentication in the authentication context indicates invalid;

a device configured to discontinue the agreement process when the biometric authentication method information in the authentication context differs from the notified biometric authentication method;

a device configured to discontinue the agreement process when the authenticator is verified based on a public key in the client certificate and a verification result indicates invalid; and a device configured to discontinue the agreement process when the time stamp is decrypted based on a public key associated with the private key of the time stamp providing apparatus and a difference between resulting date and time information and current date and time information is greater than a predetermined value.

9. A program stored in a non-transient computer-readable storage medium which is used in a client apparatus, the program comprising:

a program code which causes a client apparatus to perform, before secret communication is performed by an operation by a user with a server apparatus over a network, an agreement process including mutual certificate authentication with the server apparatus, and when a result of the certificate authentication indicates valid, a session for performing the secret communication can be established;

a program code which causes the client apparatus to sequentially perform a biometric authentication process to perform biometric authentication on the user;

a program code which causes the client apparatus to sequentially perform a process of writing a client certificate including a public key to a certificate storage device;

a program code which causes the client apparatus to sequentially perform a process of writing a private key associated with the public key to a private key storage device;

a program code which causes the client apparatus to sequentially perform a process of writing biometric authentication method information which indicates a biometric authentication method for the biometric authentication process, to a biometric authentication method storage device;

a program code which causes the client apparatus to sequentially perform a process of receiving, during the agreement process, a message including a random number from the server apparatus;

a program code which causes the client apparatus to sequentially perform a process of creating, after receiving the message, a biometric negotiation message including the biometric authentication method information and sending the biometric negotiation message to the server apparatus;

a program code which causes the client apparatus to sequentially perform a process of starting, after sending the biometric negotiation message, the biometric authentication process based on biometric authentication method information notified from the server apparatus;

a program code which causes the client apparatus to sequentially perform a process of encrypting the random number based on the private key and thereby generating an encrypted random number;

a program code which causes the client apparatus to sequentially perform a process of generating an authenticator from information guaranteeing validity of a result of the biometric authentication in the biometric authentication process and the process, the biometric authentication method information, the encrypted random number, and the client certificate, based on the private key; and a program code which causes the client apparatus to sequentially perform a process of sending to the server apparatus an authentication context including the information guaranteeing validity of a result of the biometric authentication and the process, the biometric authentication method information, the encrypted random number, the client certificate, and the authenticator and thereby continuing the agreement process.

10. A program stored in a non-transient computer-readable storage medium, the program comprising:

a program code which causes a server apparatus to perform, before secret communication is performed over a network with a client apparatus which is operated by a user, an agreement process including mutual certificate authentication with the client apparatus, and when a result of the certificate authentication indicates valid, a session for performing the secret communication can be established;

a program code which causes the server apparatus to sequentially perform a process of writing a plurality of pieces of biometric authentication method information indicating biometric authentication methods for the user which can be accepted, to a biometric authentication method storage device;

a program code which causes the server apparatus to sequentially perform a process of sending a message including a random number to the client apparatus during the agreement process;

a program code which causes the server apparatus to sequentially perform a process of receiving, after sending the message, a biometric negotiation message including biometric authentication method information which indicates a biometric authentication method of the client apparatus, from the client apparatus;

a program code which causes the server apparatus to sequentially perform a process of determining whether the biometric authentication method information in the biometric negotiation message matches any of said plurality of pieces of biometric authentication method information in the biometric authentication method storage device;

a program code which causes the server apparatus to sequentially perform a process of notifying, when a result of the determination indicates a match, the client apparatus of the biometric authentication method information;

a program code which causes the server apparatus to sequentially perform a process of receiving, after the notification, an authentication context including information guaranteeing validity of a result of biometric authentication based on the biometric authentication method information and a process thereof, the biometric authentication method information, an encrypted random number, a client certificate, and an authenticator, from the client apparatus;

a program code which causes the server apparatus to sequentially perform a process of discontinuing the agreement process when the result of biometric authentication in the authentication context indicates invalid;

a program code which causes the server apparatus to sequentially perform a process of discontinuing the agreement process when the biometric authentication method information in the authentication context and the notified biometric authentication method information differ from each other;

a program code which causes the server apparatus to sequentially perform a process of discontinuing the agreement process when the encrypted random number in the authentication context is decrypted based on a public key in the client certificate and a resulting random number differs from the random number in the message; and a program code which causes the server apparatus to sequentially perform a process of discontinuing the agreement process when the authenticator is verified based on the public key in the client certificate and a verification result indicates invalid.

11. A program stored in a non-transient computer-readable storage medium, the program comprising:

a program code which causes a client apparatus to perform, before secret communication is performed over a network with a server apparatus which is operated by a user, an agreement process including mutual certificate authentication with the client apparatus, and when a result of the certificate authentication indicates valid, a session for performing the secret communication can be established;

a program code which causes the client apparatus to sequentially perform a biometric information obtaining process to obtain biometric information from the user during the agreement process;

a program code which causes the client apparatus to sequentially perform a process of writing biometric authentication method information indicating a biometric authentication method for the biometric information obtaining process, to a biometric authentication method storage device;

a program code which causes the client apparatus to sequentially perform a random number generation process to generate a first random number;

a program code which causes the client apparatus to sequentially perform a process of creating a first message including the first random number and sending the first message to the server apparatus during the agreement process;

a program code which causes the client apparatus to sequentially perform a process of receiving, after sending the first message, a second message including a second random number from the server apparatus;

a program code which causes the client apparatus to sequentially perform a process of creating a biometric negotiation message including the biometric authentication method information and sending the biometric negotiation message to the server apparatus;

a program code which causes the client apparatus to sequentially perform a process of starting, after sending the biometric negotiation message, the biometric information obtaining process based on biometric authentication method information notified from the server apparatus;

a program code which causes the client apparatus to sequentially perform a process of generating an encryption parameter by a hash algorithm, based on the first random number and the second random number; and a program code which causes the client apparatus to sequentially perform a process of encrypting the biometric information obtained in the biometric information obtaining process, based on the encryption parameter and notifying the server apparatus of resulting encrypted biometric information and thereby continuing the agreement process.

12. A program stored in a non-transient computer-readable storage medium, the program comprising:

a program code which causes a server apparatus to perform, before secret communication is performed over a network with a client apparatus which is operated by a user, an agreement process including mutual certificate authentication with the client apparatus, and when a result of the certificate authentication indicates valid, a session for performing the secret communication can be established;

a program code which causes the server apparatus to sequentially perform a process of writing a plurality of pieces of biometric authentication method information indicating biometric authentication methods for the user which can be accepted, to a biometric authentication method storage device;

a program code which causes the server apparatus to sequentially perform a process of writing biometric reference information of the user to a biometric reference information storage device;

a program code which causes the server apparatus to sequentially perform a process of receiving a first message including a first random number from the client apparatus during the agreement process;

a program code which causes the server apparatus to sequentially perform a process of sending, after receiving the first message, a second message including a second random number to the client apparatus;

a program code which causes the server apparatus to sequentially perform a process of receiving from the client apparatus a biometric negotiation message including biometric authentication method information indicating a biometric authentication method of the client apparatus;

a program code which causes the server apparatus to sequentially perform a process of determining whether the biometric authentication method information in the biometric negotiation message matches any of said plurality of pieces of biometric authentication method information in the biometric authentication method storage device;

a program code which causes the server apparatus to sequentially perform a process of notifying, when a result of the determination indicates a match, the client apparatus of the biometric authentication method information;

a program code which causes the server apparatus to sequentially perform a process of receiving, after the notification, encrypted biometric information from the client apparatus, the encrypted biometric information being obtained by encrypting biometric information of the user which is obtained according to the biometric authentication method information, based on the first random number and the second random number;

a program code which causes the server apparatus to sequentially perform a process of generating an encryption parameter by a hash algorithm, based on the first random number in the first message and the second random number in the second message;

a program code which causes the server apparatus to sequentially perform a process of decrypting the encrypted biometric information based on the encryption parameter;

a program code which causes the server apparatus to sequentially perform a biometric authentication process which performs biometric authentication on biometric information which is obtained as a result of the decryption, based on the biometric reference information in the biometric reference information storage device; and a program code which causes the server apparatus to sequentially perform a process of discontinuing the agreement process when a result of the biometric authentication indicates invalid.

13. A program stored in a non-transient computer-readable storage medium, the program comprising:

a program code which causes a client apparatus to perform, before secret communication is performed by an operation by a user with a server apparatus over a network, an agreement process including mutual certificate authentication with the server apparatus, and when a result of the certificate authentication indicates valid, a session for performing the secret communication can be established;

a program code which causes the client apparatus to sequentially perform a biometric authentication process to perform biometric authentication on the user;

a program code which causes the client apparatus to sequentially perform a process of writing a client certificate including a public key to a certificate storage device;

a program code which causes the client apparatus to sequentially perform a process of writing a private key associated with the public key to a private key storage device;

a program code which causes the client apparatus to sequentially perform a process of sending, during the agreement process, a first message including a fact that the client certificate is to be obtained based on a result of the biometric authentication of the user, to the server apparatus;

a program code which causes the client apparatus to sequentially perform a process of receiving, after sending the first message, a second message including a random number from the server apparatus;

a program code which causes the client apparatus to sequentially perform a process of starting the biometric authentication process after receiving the second message;

a program code which causes the client apparatus to sequentially perform a process of encrypting the random number based on the private key and thereby generating an encrypted random number;

a program code which causes the client apparatus to sequentially perform a process of sending the client certificate in the certificate storage device to the server apparatus when a result of the biometric authentication in the biometric authentication process indicates valid;

a program code which causes the client apparatus to sequentially perform a process of generating an authenticator from information guaranteeing validity of the result of the biometric authentication and a process thereof and the encrypted random number, based on the private key; and a program code which causes the client apparatus to sequentially perform a process of sending to the server apparatus an authentication context including the information guaranteeing validity of the result of the biometric authentication and a process thereof, the encrypted random number, and the authenticator and thereby continuing the agreement process.

14. A program stored in a non-transient computer-readable storage medium, the program comprising:

a program code which causes a server apparatus to perform, before secret communication is performed over a network with a client apparatus which is operated by a user, an agreement process including mutual certificate authentication with the client apparatus, and when a result of the certificate authentication indicates valid, a session for performing the secret communication can be established;

a program code which causes the server apparatus to sequentially perform a process of receiving, during the agreement process, a first message including a fact that a client certificate is to be obtained based on a result of biometric authentication of the user, from the client apparatus;

a program code which causes the server apparatus to sequentially perform a process of sending, after receiving the first message, a second message including a random number to the client apparatus;

a program code which causes the server apparatus to sequentially perform a process of receiving, after sending the second message, a client certificate from the client apparatus;

a program code which causes the server apparatus to sequentially perform a process of receiving, after sending the second message, an authentication context including a result of biometric authentication of the user, an encrypted random number, and an authenticator, from the client apparatus;

a program code which causes the server apparatus to sequentially perform a process of writing the received client certificate and authentication context to a storage device;

a program code which causes the server apparatus to sequentially perform a process of discontinuing the agreement process when the result of biometric authentication in the authentication context stored in the storage device indicates invalid;

a program code which causes the server apparatus to sequentially perform a process of discontinuing the agreement process when the encrypted random number in the authentication context stored in the storage device is decrypted based on a public key in the client certificate and a resulting random number differs from the random number in the second message; and a program code which causes the server apparatus to sequentially perform a process of discontinuing the agreement process when the authenticator is verified based on the public key in the client certificate stored in the storage device and a verification result indicates invalid.

15. A program stored in a non-transient computer-readable storage medium, the program comprising:

a program code which causes a client apparatus to perform, before secret communication is performed by an operation by a user with a server apparatus over a network, an agreement process including mutual certificate authentication with the server apparatus, and when a result of the certificate authentication indicates valid, a session for performing the secret communication can be established;

a program code which causes the client apparatus to sequentially perform a process of writing a client certificate including a public key to a certificate storage device;

a program code which causes the client apparatus to sequentially perform a process of writing a private key associated with the public key to a private key storage device;

a program code which causes the client apparatus to sequentially perform a biometric authentication process to perform biometric authentication on the user before the agreement process;

a program code which causes the client apparatus to sequentially perform a process of writing biometric authentication method information indicating a biometric authentication method for the biometric authentication process, to a biometric authentication method storage device;

a program code which causes the client apparatus to sequentially perform a process of generating an authenticator from information guaranteeing validity of a result of the biometric authentication and a process thereof, the biometric authentication method information, and the client certificate, based on the private key;

a program code which causes the client apparatus to sequentially perform a process of creating, before the agreement process, an authentication context including the information guaranteeing validity of a result of the biometric authentication and a process thereof, the biometric authentication method information, the client certificate, and the authenticator;

a program code which causes the client apparatus to sequentially perform a process of sending, before the agreement process, the authentication context to a time stamp providing apparatus;

a program code which causes the client apparatus to sequentially perform a process of receiving from the time stamp providing apparatus an authentication context assigned a time stamp by assigning the time stamp to the sent authentication context and date and time information in the time stamp providing apparatus, the time stamp being generated based on a private key of the time stamp providing apparatus;

a program code which causes the client apparatus to sequentially perform a process of creating, during the agreement process, a biometric negotiation message including the biometric authentication method information and sending the biometric negotiation message to the server apparatus; and a program code which causes the client apparatus to sequentially perform a process of sending, after sending the biometric negotiation message, the authentication context assigned a time stamp to the server apparatus based on biometric authentication method information notified from the server apparatus and thereby continuing the agreement process.

16. A program stored in a non-transient computer-readable storage medium, the program comprising:

a program code which causes the server to perform, before secret communication is performed over a network with a client apparatus which is operated by a user, an agreement process including mutual certificate authentication with the client apparatus, and when a result of the certificate authentication indicates valid, a session for performing the secret communication can be established;

a program code which causes the server apparatus to sequentially perform a process of writing a plurality of pieces of biometric authentication method information indicating biometric authentication methods for the user which can be accepted, to a biometric authentication method storage device;

a program code which causes the server apparatus to sequentially perform a process of receiving, during the agreement process, a biometric negotiation message including biometric authentication method information indicating a biometric authentication method of the client apparatus, from the client apparatus;

a program code which causes the server apparatus to sequentially perform a process of determining whether the biometric authentication method information in the biometric negotiation message matches any of said plurality of pieces of biometric authentication method information in the biometric authentication method storage device;

a program code which causes the server apparatus to sequentially perform a process of notifying, when a result of the determination indicates a match, the client apparatus of the biometric authentication method information;

a program code which causes the server apparatus to sequentially perform a process of receiving, after the notification, an authentication context which is assigned a time stamp based on a private key of a time stamp providing apparatus and which includes information guaranteeing validity of a result of biometric authentication of the user and a process thereof, biometric authentication method information, a client certificate, and an authenticator, from the client apparatus;

a program code which causes the server apparatus to sequentially perform a process of discontinuing the agreement process when the result of biometric authentication in the authentication context indicates invalid;

a program code which causes the server apparatus to sequentially perform a process of discontinuing the agreement process when the biometric authentication method information in the authentication context differs from the notified biometric authentication method;

a program code which causes the server apparatus to sequentially perform a process of discontinuing the agreement process when the authenticator is verified based on a public key in the client certificate and a verification result indicates invalid; and a program code which causes the server apparatus to sequentially perform a process of discontinuing the agreement process when the time stamp is decrypted based on a public key associated with the private key of the time stamp providing apparatus and a difference between resulting date and time information and current date and time information is greater than a predetermined value.

* * * * *